US012119155B2

(12) United States Patent
Fukuda et al.

(10) Patent No.: US 12,119,155 B2
(45) Date of Patent: Oct. 15, 2024

(54) REACTOR

(71) Applicant: Mitsubishi Electric Corporation, Tokyo (JP)

(72) Inventors: Tomohito Fukuda, Tokyo (JP); Takashi Kumagai, Tokyo (JP); Hideo Noda, Tokyo (JP); Kazuyuki Shibata, Tokyo (JP); Masanori Kageyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 686 days.

(21) Appl. No.: 16/960,360

(22) PCT Filed: Mar. 6, 2019

(86) PCT No.: PCT/JP2019/008860
§ 371 (c)(1),
(2) Date: Jul. 7, 2020

(87) PCT Pub. No.: WO2019/176686
PCT Pub. Date: Sep. 19, 2019

(65) Prior Publication Data

US 2021/0065957 A1 Mar. 4, 2021

(30) Foreign Application Priority Data

Mar. 15, 2018 (JP) ................................ 2018-047559

(51) Int. Cl.
*H01F 27/02* (2006.01)
*H01F 27/08* (2006.01)
(Continued)

(52) U.S. Cl.
CPC ........... *H01F 27/025* (2013.01); *H01F 27/08* (2013.01); *H01F 27/24* (2013.01); *H01F 27/28* (2013.01); *H01F 41/0206* (2013.01)

(58) Field of Classification Search
CPC ........ H01F 27/025; H01F 27/08; H01F 27/02; H01F 27/24; H01F 27/28; H01F 3/14;
(Continued)

(56) References Cited

U.S. PATENT DOCUMENTS 2,907,968 A * 10/1959 Thurk .................... H01F 30/16 336/229
2,946,973 A * 7/1960 Lufcy .................... H01F 27/25 336/213
(Continued)

FOREIGN PATENT DOCUMENTS

DE 112016003964 T5 5/2018
JP H0817649 A 1/1996
(Continued)

OTHER PUBLICATIONS

International Search Report (PCT/ISA/210), with translation, and Written Opinion (PCT/ISA/237) mailed on Apr. 23, 2019, by the Japan Patent Office as the International Searching Authority for International Application No. PCT/JP2019/008860.
(Continued)

*Primary Examiner* — Mang Tin Bik Lian
(74) *Attorney, Agent, or Firm* — BUCHANAN INGERSOLL & ROONEY PC

(57) ABSTRACT

The present invention has an object of providing a reactor including cores with higher heat dissipation and a coil with less eddy-current loss. A reactor according to the present invention includes: a plurality of divided cores having a shape obtained by dividing an annular core in a circumferential direction, the divided cores being made of a soft magnetic material; a core gap part disposed between the divided cores in the annular core formed by combining the plurality of divided cores, the core gap part being made of a non-magnetic material; annular heat-dissipating cases that house the divided cores and the core gap part; and a coil
(Continued)

wound around the heat-dissipating cases, wherein the heat-dissipating cases are made of a material whose thermal conductivity is as high as 100 W/(m·K) or more.

2 Claims, 19 Drawing Sheets

(51) Int. Cl.

| | |
|---|---|
| ***H01F 27/24*** | (2006.01) |
| ***H01F 27/28*** | (2006.01) |
| ***H01F 41/02*** | (2006.01) |

(58) Field of Classification Search

CPC ........ H01F 17/06; H01F 17/062; H01F 27/22; H01F 37/00; H01F 30/16; H01F 2038/305

See application file for complete search history.

(56) References Cited

U.S. PATENT DOCUMENTS 4,646,803 A * 3/1987 Hanaoka ............... H01F 27/324 336/219
4,683,919 A * 8/1987 Macemon ............... H01F 41/08 33/561
4,763,072 A * 8/1988 Katoh .................... G01R 33/04 324/253
4,779,812 A * 10/1988 Fisher ................... H01F 41/022 242/434.7
6,262,651 B1 * 7/2001 Miyamoto .............. H01F 27/29 336/198
7,710,228 B2 * 5/2010 Feng ..................... H01F 41/122 336/131
2001/0030594 A1 10/2001 Abe et al.
2014/0306790 A1 * 10/2014 Fukui .................... H01F 27/006 336/196
2015/0061817 A1 * 3/2015 Lee ...................... H01F 17/0013 336/221
2015/0228401 A1 * 8/2015 Ratz .................... H01F 27/2895 336/198
2015/0318097 A1 * 11/2015 Pagenkopf ................ H01F 3/14 336/20
2017/0093198 A1 * 3/2017 Graham .................. H01F 38/14
2018/0174732 A1 * 6/2018 Pal .......................... H01F 30/16
2018/0174739 A1 6/2018 Nakajima et al.
2019/0355500 A1 * 11/2019 Lee ........................... H01F 1/34

FOREIGN PATENT DOCUMENTS

JP 2003197444 A 7/2003
JP 2012109440 A * 6/2012
JP 2013153025 A 8/2013
JP 2015122456 A 7/2015

OTHER PUBLICATIONS

Office Action issued on Aug. 23, 2021, in corresponding Chinese Patent Application No. 201980016381.3 and English translation of the Office Action. (13 pages).

* cited by examiner

REACTOR

TECHNICAL FIELD

This invention relates to a reactor.

BACKGROUND ART

Recent years have seen an increasing demand for downsizing power converters and increasing output. It is generally known that increasing a switching frequency of a semiconductor element included in a power converter can downsize a reactor included in the power converter. However, increase in the switching frequency increases the quantity of heat generated in cores of the reactor. Moreover, downsizing the reactor reduces a heat dissipation area. Thus, the heat dissipation from the cores decreases.

Furthermore, cores of conventional reactors are covered with a resin case with a low thermal conductivity. A coil made of copper or aluminum is wound around the resin case. Thus, high thermal resistance from the cores of the reactor to the atmosphere outside the coil, and low heat dissipation become problems.

In the reactor, gaps (hereinafter referred to as "core gaps") are formed in magnetic paths of the cores for obtaining desired electrical characteristics. Linkage of the magnetic flux leaked from the core gaps with the wound coil causes an eddy-current loss in the coil. It is generally known that increase in the length of the core gap increases the eddy-current loss. Approximately only three core gaps at most are formed in a reactor for increasing the productivity of the reactor, which causes problems of increase in the length per core gap and increase in the eddy-current loss in the coil.

Patent Document 1 describes increasing the heat dissipation in the reactor by filling a heat-dissipating case for housing the reactor with an elastic resin or insulating oil.

PRIOR ART DOCUMENT

Patent Document

[Patent Document 1] Japanese Patent Application Laid-Open No. 2003-197444

SUMMARY

Problem to be Solved by the Invention

In the reactor of Patent Document 1, however, the cores are covered with an elastic resin with a low thermal conductivity. Thus, thermal resistance from the core to the heat-dissipating case is high, and the heat dissipation from the cores is low. Since the divided cores are bonded via, for example, an adhesive, low precision in the length of the core gap and increase in the eddy-current loss in the coil due to the magnetic flux leaked from the core gaps become problems.

The present invention has been conceived to solve the problems, and has an object of providing a reactor including cores with higher heat dissipation and a coil with less eddy-current loss.

Means to Solve the Problem

A reactor according to the present invention includes: a plurality of divided cores having a shape obtained by dividing an annular core in a circumferential direction, the divided cores being made of a soft magnetic material; a core gap part disposed between the divided cores in the annular core formed by combining the plurality of divided cores, the core gap part being made of a non-magnetic material; annular heat-dissipating cases that house the divided cores and the core gap part; and a coil wound around the heat-dissipating cases. The heat-dissipating cases are made of a material whose thermal conductivity is as high as 100 W/(m·K) or more.

Advantages of the Invention

The reactor according to the present invention can achieve the high heat dissipation from the divided cores by dissipating the heat generated in the divided cores from the heat-dissipating cases. Further, since the core gaps are distributed into a plurality of portions according to the number of divided cores, the eddy-current loss of the coil caused by the linkage of the magnetic flux leaked from the core gaps with the coil can be reduced. The object, features, aspects and advantages of the present invention will become more apparent from the following detailed description and the accompanying drawings.

DESCRIPTION OF EMBODIMENTS

Figure 1:
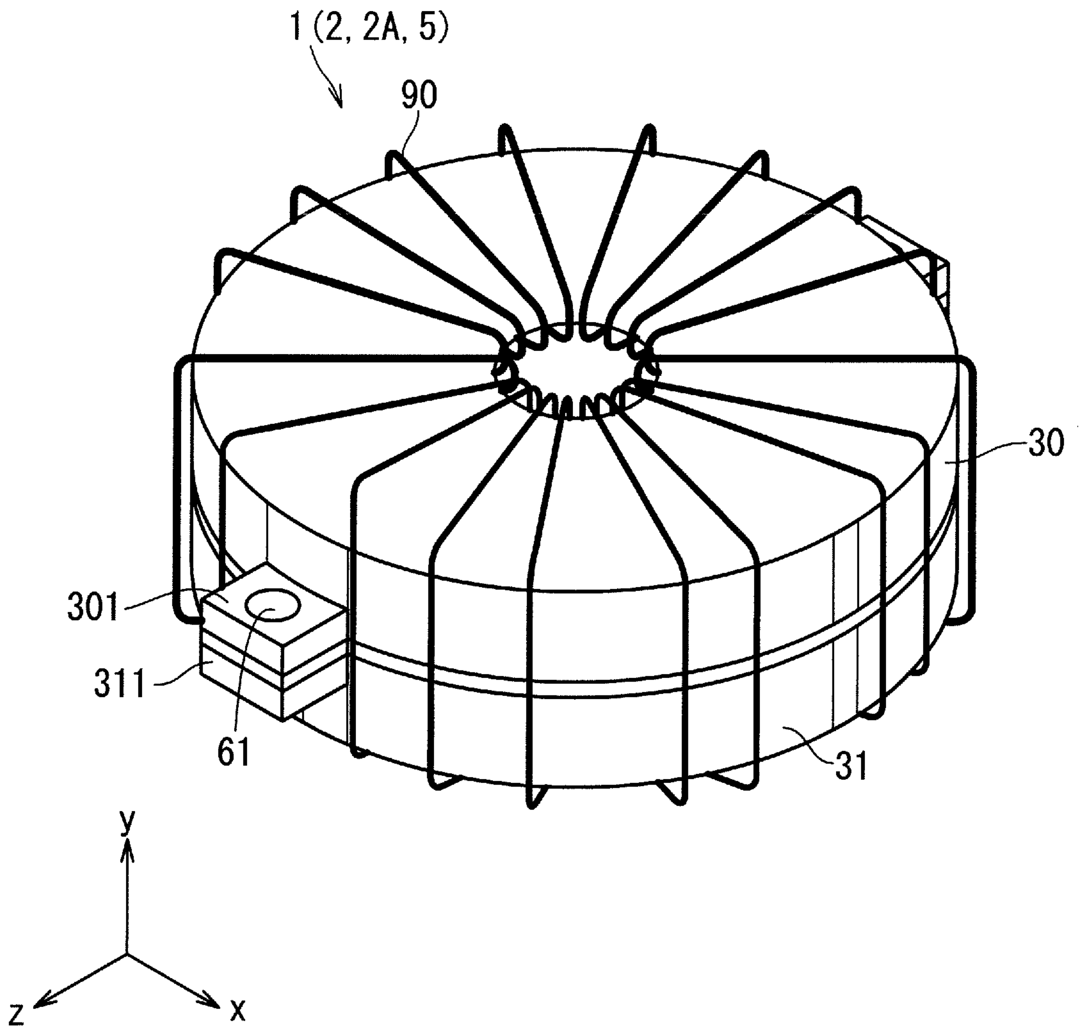
FIG. 1 illustrates a perspective view of a reactor according to Embodiment 1.

Embodiments of the present invention will be hereinafter described. In different Embodiments, the same reference numerals will be assigned to the same structures, and the description thereof will not be repeated.

A. Embodiment 1

[A-1 Structure]

Figure 2:
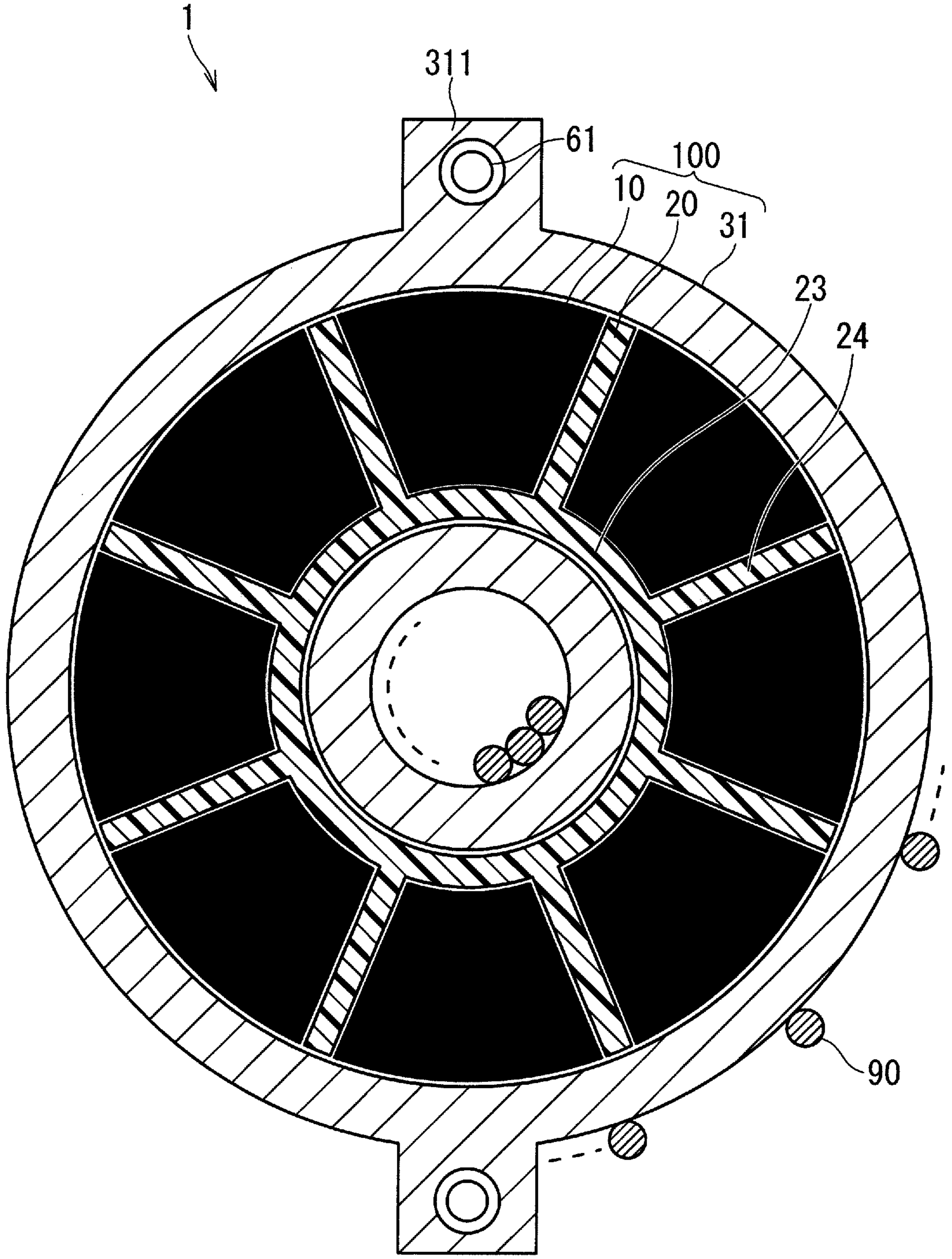
FIG. 2 is a sectional view of the reactor according to Embodiment 1.
Figure 3:
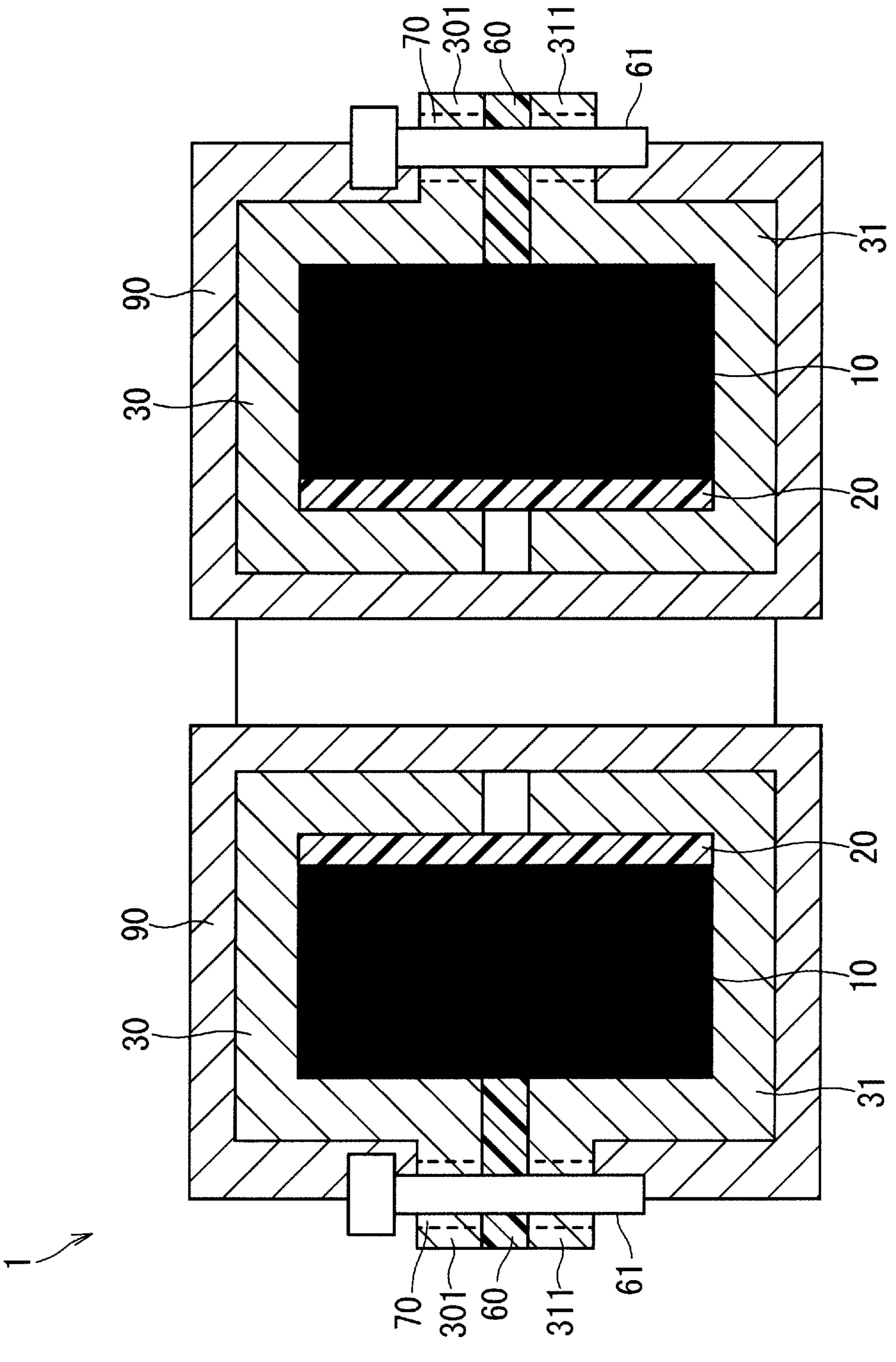
FIG. 3 is a sectional view of the reactor according to Embodiment 1.

A reactor 1 according to Embodiment 1 will be described with reference to FIGS. 1 to 3. FIG. 1 is a perspective view of the reactor 1. In FIG. 1, the horizontal direction is defined as an X-axis, the vertical direction is defined as a Y-axis, and the depth direction is defined as a Z-axis. FIG. 2 is a sectional view of the reactor 1 in an X-Z plane. FIG. 3 is a sectional view of the reactor 1 in a Y-Z plane which extends through the center of the ring of each of annular heat-dissipating cases 30 and 31.

The reactor 1 includes a magnetic part 100 and a coil 90 wound around the magnetic part 100. The magnetic part 100 includes a plurality of divided cores 10, a core gap part 20 made of a non-magnetic material, the heat-dissipating cases 30 and 31, and fixing parts 60 and 61.

Each of the divided cores 10 has a shape obtained by dividing a general annular core in a circumferential direction. In other words, a combination of the plurality of divided cores 10 forms an annular core. The divided cores 10 are made of a soft magnetic material, and are dust cores, ferrite cores, amorphous cores, or nanocrystalline cores. When the divided cores 10 are dust cores, examples of the material contained in the divided cores 10 include pure iron, an Fe—Si alloy, an Fe—Si—Al alloy, an Ni—Fe alloy, and an Ni—Fe—Mo alloy. When the divided cores 10 are ferrite cores, examples of the material contained in the divided cores 10 include Mn—Zn ferrites or Ni—Zn ferrites. A powdered resin may be applied to the divided cores 10 for insulation.

Dust cores and ferrite cores are generally formed by molding a pulverulent material using a pressing machine and then performing a thermal process on the material. Here, the pressure to be applied to a pressed surface needs to be constant. As the cores are upsized, a pressing machine with higher press capacity needs to be used. Since the molded material shrinks in a thermal process, the dimensional precision is reduced as the cores are upsized. Amorphous cores and nanocrystalline cores are formed by laminating thin strip materials and then performing a thermal process on the materials. Since these cores also shrink in a thermal process similarly to the dust cores and the ferrite cores, the dimensional precision is reduced as the cores are upsized. Since each of the divided cores 10 has the shape obtained by dividing an annular core and is smaller than the annular core, the divided cores 10 can be easily manufactured and variations of dimensions in the manufacturing can be reduced.

The core gap part 20 is made of a non-magnetic material, for example, a resin or an insulating paper. Examples of the available resin contained in the core gap part 20 include polypropylene (PP), ABS, polyethylene terephthalate (PET), polycarbonate (PC), fluorine, phenol, melamine, polyurethane, epoxy, and silicon. Furthermore, examples of the available insulating paper contained in the core gap part 20 include kraft pulp, aramid, and a fiber.

The core gap part 20 is a unitary component consisting of a cylindrical part 23 and a plurality of thin plate parts 24 radially protruding from the outer circumferential surface of the cylindrical part 23. The cylindrical part 23 of the core gap part 20 is disposed so that its outer circumferential surface is in contact with the inner circumferential surface of the annular core formed by combining the plurality of divided cores 10. The plurality of divided cores 10 are disposed in the space outside the cylindrical part 23 that is partitioned by the thin plate parts 24 of the core gap part 20. Thus, the thickness of the thin plate part 24 is equal to the length of the core gap.

When the divided cores 10 are dust cores, the relative permeability of the dust cores is as small as approximately 26 to 150. Thus, the thickness of the thin plate parts 24 of the core gap part 20 is defined so that the total length of the core gaps ranges from approximately 0.1 to 2 mm. When the divided cores 10 are ferrite cores, the relative permeability of the ferrite cores is as high as 1500 to 4000. Thus, the thickness of the thin plate parts 24 of the core gap part 20 is defined so that the total length of the core gaps is increased as high as approximately 0.1 to 20 mm. As the number of the divided cores 10 and the number of the core gaps are many, the length of one of the core gaps is reduced. Thus, the eddy-current loss caused by the linkage of the magnetic flux leaked from the core gaps with the coil 90 can be reduced.

The core gap part 20 may be formed by superposing a plurality of core gap parts in the vertical direction. For facilitating the manufacture, the core gap part 20 may be fixed to the divided cores 10 with application of an adhesive to a part or all of the surfaces of the core gap part 20 that are in contact with the divided cores 10. The core gap part 20 may include an annular part instead of the cylindrical part 23.

Each of the heat-dissipating cases 30 and 31 is annular with one end surface opened. The heat-dissipating cases 30 and 31 house the divided cores 10 and the core gap part 20 from the opposite directions. The heat-dissipating case 30 includes protrusions 301 protruding vertically from the outer circumferential surface. Fixing holes 70 are formed in the protrusions 301. Similarly, the heat-dissipating case 31 also includes protrusions 311 protruding vertically from the outer circumferential surface. The fixing holes 70 are formed in the protrusions 311. As illustrated in FIG. 3, threadedly engaging fixing parts 61 in the fixing holes of the heat-dissipating cases 30 and 31 fasten the heat-dissipating cases 30 and 31. The heat-dissipating cases 30 and 31 are made of a material whose thermal conductivity is as high as 100 W/(m·K) or more, for example, copper, aluminum, gold, silver, silicon, or nickel.

FIGS. 2 and 3 illustrate the two protrusions 311 and the two fixing holes 70. The number of the fixing holes 70 in the heat-dissipating cases 30 and 31 is not limited to two but may be three or more. The fixing holes 70 are not limited to tapped holes but may be drilled holes.

FIG. 1 illustrates the heat-dissipating cases 30 and 31 with the same shape. The use of the same shape of the heat-dissipating cases 30 and 31 reduces costs. The heat-dissipating cases 30 and 31 may have different shapes as long as they come in contact with a part or all of the surfaces of the divided cores 10. The thicker the heat-dissipating cases 30 and 31 are, the greater thermal diffusivity they have. Preferably, each of the heat-dissipating cases 30 and 31 is approximately 1 to 5 mm thick in consideration of the facilitation of the manufacture.

The fixing part 60 is disposed between the heat-dissipating cases 30 and 31 to avoid their direct contact. The fixing part 60 is made of, for example, a resin, an insulating paper, or a non-conductive adhesive. Examples of the resin contained in the fixing part 60 include polypropylene (PP), ABS, polyethylene terephthalate (PET), polycarbonate (PC), fluorine, phenol, melamine, polyurethane, epoxy, and silicon. Examples of the insulating paper contained in the fixing part 60 include kraft pulp, aramid, and a fiber.

Figure 4:
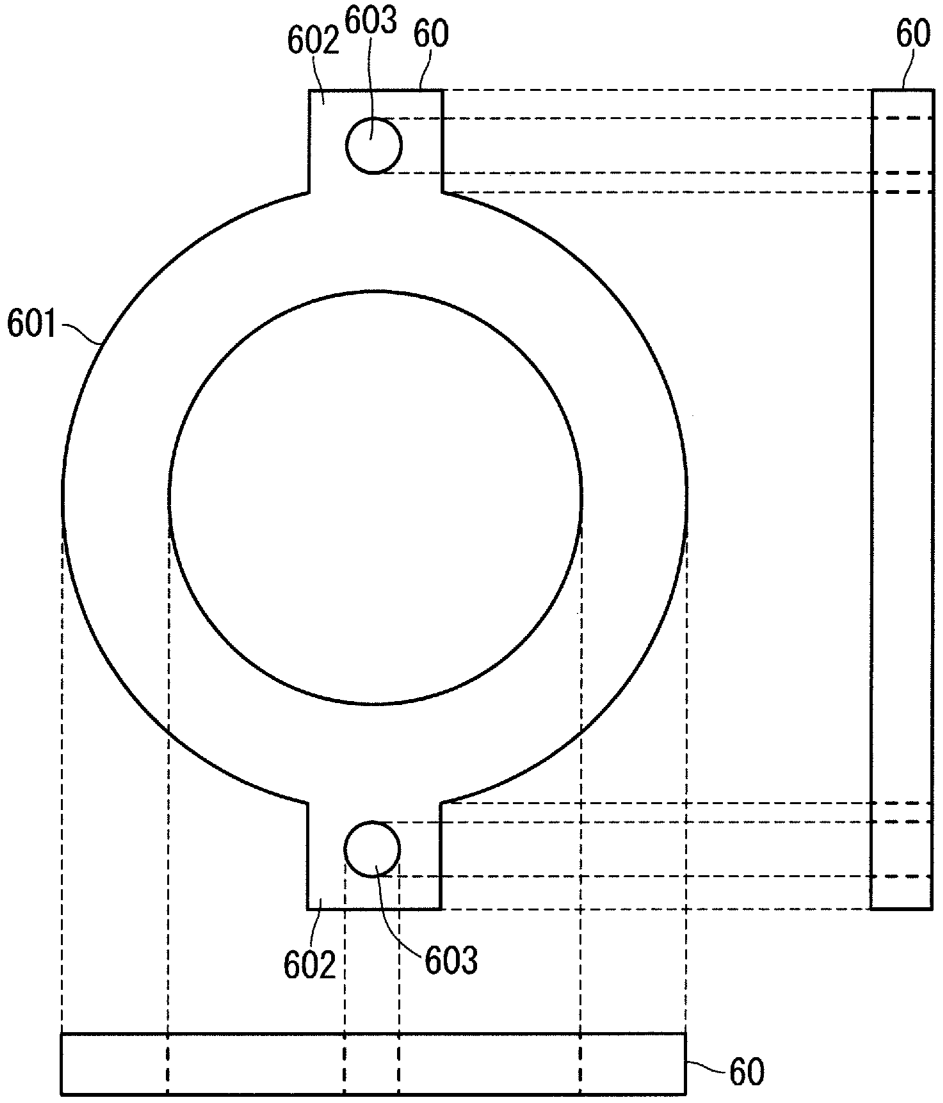
FIG. 4 is an orthographic view of a fixing part.

FIG. 4 is an orthographic view of the fixing part 60. The fixing part 60 includes an annulus 601 in contact with the outer circumferential surfaces of the heat-dissipating cases 30 and 31, and two protrusions 602 protruding from the annulus 601. The protrusions 602 are portions in contact with the protrusions 301 and 311 of the heat-dissipating cases 30 and 31, respectively, and each include a fixing hole 603 into which the fixing part 61 is inserted in alignment with the fixing hole 70. In other words, inserting the fixing part 61 into the fixing hole 70 of the heat-dissipating case 30, the fixing hole 603 of the fixing part 60, and the fixing hole 70 of the heat-dissipating case 31 allows the heat-dissipating case 30 to be fixed to the heat-dissipating case 31 through the fixing part 60.

The shape of the fixing part 60 illustrated in FIG. 4 is an example shape when the fixing part 60 is made of a resin or an insulating paper. When the fixing part 60 is made of a non-conductive adhesive, the fixing part 60 fixes the heat-dissipating case 30 and the heat-dissipating case 31. Thus, the heat-dissipating cases 30 and 31 need not include the fixing holes 70.

Since a current flows through the coil 90, the coil 90 is made of copper or aluminum with a low electrical resistivity. To prevent short circuit in adjacent portions of the coil 90, it is preferred that the coil 90 is insulation-coated or an insulating paper is wrapped around the coil 90. Preferably, the insulation coating or the insulating paper is approximately 0.001 to 0.1 mm thick in view of preventing the short circuit in the adjacent portions of the coil 90.

[A-2. Manufacturing Method]

Next, a method for manufacturing the reactor 1 will be described.

First, the divided cores 10 and the core gap part 20 are housed in the heat-dissipating case 31. In this state, the lower portion of the divided cores 10 and the core gap part 20 is housed in the heat-dissipating case 31, and the upper portion thereof protrudes from the heat-dissipating case 31. Next, the fixing part 60 is disposed on the open end surface of the heat-dissipating case 31. Further, the upper portion of the divided cores 10 and the core gap part 20 is housed in the heat-dissipating case 30. Then, the fixing parts 61 are fastened to the fixing holes 70 of the heat-dissipating cases 30 and 31 to form the magnetic part 100. Finally, the coil 90 is wound around the magnetic part 100 to form the reactor 1.

[A-3. Advantages]

The heat generated from the divided cores 10 of the reactor 1 is dissipated to the atmosphere outside the reactor 1 (hereinafter simply referred to as "atmosphere") through the following two routes.

A heat-dissipating route 1: the divided cores 10→the heat-dissipating cases 30 and 31→the coil 90→the atmosphere A heat-dissipating route 2: the divided cores 10→the heat-dissipating cases 30 and 31→the atmosphere Since the heat-dissipating cases 30 and 31 are made of a material whose thermal conductivity is as high as 100 W/(m·K) or more as described above, the thermal resistance is low. Thus, the thermal resistance of the heat-dissipating route 2 is sufficiently low. Further, since the insulation coating of the coil 90 or the insulating paper wrapped around the coil 90 is approximately 0.001 to 0.1 mm thick, the thermal resistance is low. Further, since the coil 90 per se is made of copper or aluminum and the thermal conductivity is as high as 100 W/(m·K) or more, the thermal resistance is low. Thus, the thermal resistance of the heat-dissipating route 1 is sufficiently lower than those of the conventional structures. In other words, since the thermal resistances in both of the heat-dissipating routes 1 and 2 are low, the high heat dissipation from the divided cores 10 can be achieved in the reactor 1.

Further, disposing the outer circumferential surface of the cylindrical part 23 of the core gap part 20 in contact with the inner circumferential surface of the annular core formed by combining the plurality of divided cores 10 allows the divided cores 10 to be pressed toward the outer circumference of the heat-dissipating cases 30 and 31 and come in contact with the outer circumferential surface of the heat-dissipating cases 30 and 31. The high heat dissipation from the divided cores 10 is achieved by dissipating the heat generated in the divided cores 10 not from the inner circumferential surface of the heat-dissipating cases 30 and 31 where the heat of the coil 90 is concentrated but from the outer circumferential surface of the heat-dissipating cases 30 and 31 where the heat of the coil 90 is not concentrated.

Further, a combination of the plurality of divided cores 10 forms a large annular core. Thus, the characteristic distributions caused by the manufacturing variations of the divided cores 10 can be minimized. This prevents, for example, local increase in the quantity of heat generated in the large annular core, and unifies the distribution of the heat of the annular core. Thus, the high heat dissipation is achieved.

Further, since the length of the core gap can be adjusted according to the thickness of the thin plate part 24 of the core gap part 20 with high precision, variations in the electrical performance caused by variations in the core gap can be suppressed.

Further, since the core gaps are distributed into a plurality of portions, the eddy-current loss of the coil 90 caused by the linkage of the magnetic flux leaked from the core gaps with the coil 90 is reduced.

The reactor 1 according to Embodiment 1 includes: the plurality of divided cores 10 having a shape obtained by dividing an annular core in a circumferential direction, the divided cores being made of a soft magnetic material; the core gap part 20 disposed between the divided cores 10 in the annular core formed by combining the plurality of divided cores 10, the core gap part 20 being made of a non-magnetic material; the annular heat-dissipating cases 30 and 31 that house the divided cores 10 and the core gap part 20; and the coil 90 wound around the heat-dissipating cases 30 and 31. The heat-dissipating cases are made of a material whose thermal conductivity is as high as 100 W/(m·K) or more. Such a structure can dissipate the heat generated in the divided cores 10 from the heat-dissipating cases 30 and 31, and increase the heat dissipation from the divided cores 10. Further, since the core gaps are distributed into a plurality of portions according to the number of divided cores 10, the eddy-current loss of the coil 90 caused by the linkage of the magnetic flux leaked from the core gaps with the coil 90 is reduced. Further, the high heat dissipation from the divided cores 10 and reduction in the eddy-current loss of the coil 90 reduce increase in the temperature of the components included in the reactor 1, which increases the capacity of the reactor 1, downsizes the reactor 1, and reduces the cost of the reactor 1.

B. Embodiment 2

[B-1. Structure]

Figure 5:
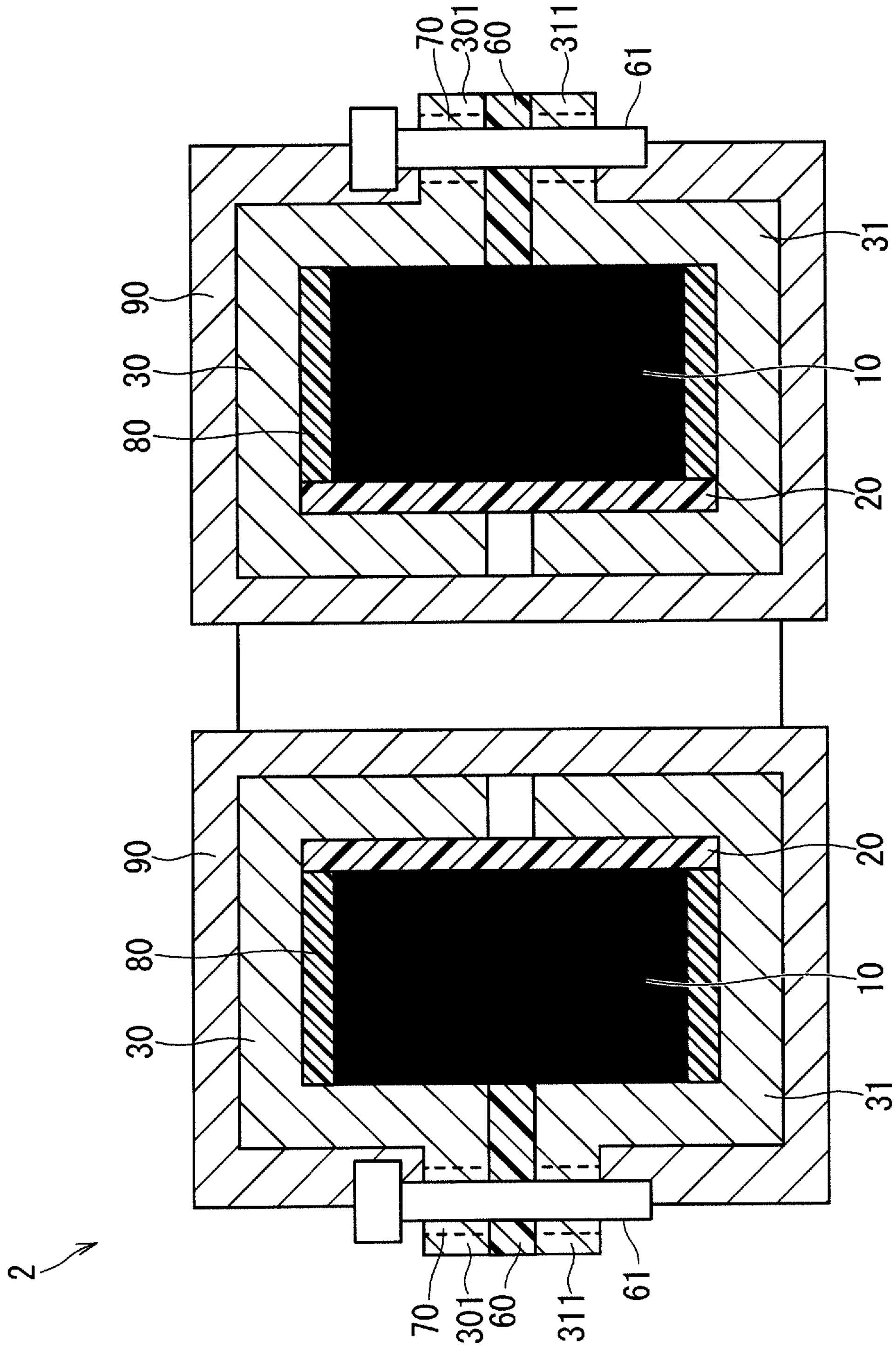
FIG. 5 is a sectional view of a reactor according to Embodiment 2.

The structure of a reactor 2 according to Embodiment 2 will be described. FIG. 1 also illustrates the perspective view of the reactor 2, which is identical to that of the reactor 1 according to Embodiment 1. FIG. 5 is a sectional view of the reactor 2 in the Y-Z plane which extends through the center of the ring of each of the heat-dissipating cases 30 and 31.

The reactor 2 includes first heat-dissipating components 80 between the upper surface of the divided cores 10 and the heat-dissipating case 30 and further between the lower surface of the divided cores 10 and the heat-dissipating case 31. The structure of the reactor 2 other than the first heat-dissipating components 80 is identical to that of the reactor 1 according to Embodiment 1. As such, disposing the first heat-dissipating components 80 between the divided cores 10 and the heat-dissipating cases 30 and 31 reduces the thermal contact resistance between the heat-dissipating cases 30 and 31 and increases the heat dissipation from the divided cores 10 more than the case where the divided cores 10 are in direct contact with the heat-dissipating cases 30 and 31. Since the first heat-dissipating components 80 accommodate variations in dimensions of the divided cores 10 and the heat-dissipating cases 30 and 31, variations in the contact area between the divided cores 10 and the heat-dissipating cases 30 and 31 through the first heat-dissipating components 80 are suppressed among products.

The first heat-dissipating components 80 are made of a resin or rubber. Examples of the resin contained in the first heat-dissipating components 80 include polybutylene terephthalate (PBT), polyphenylene sulfide (PPS), and polyether ether ketone (PEEK). The first heat-dissipating components 80 may contain thermally conductive fillers in addition to these materials. Examples of the rubber contained in the first heat-dissipating components 80 include silicon and urethane. The first heat-dissipating components 80 may have rigidity or flexibility. To accommodate variations in dimensions of the divided cores 10 and the heat-dissipating cases 30 and 31, it is preferred that the first heat-dissipating components 80 are approximately 0.1 to 3 mm thick.

[B-2. Modifications]

Figure 6:
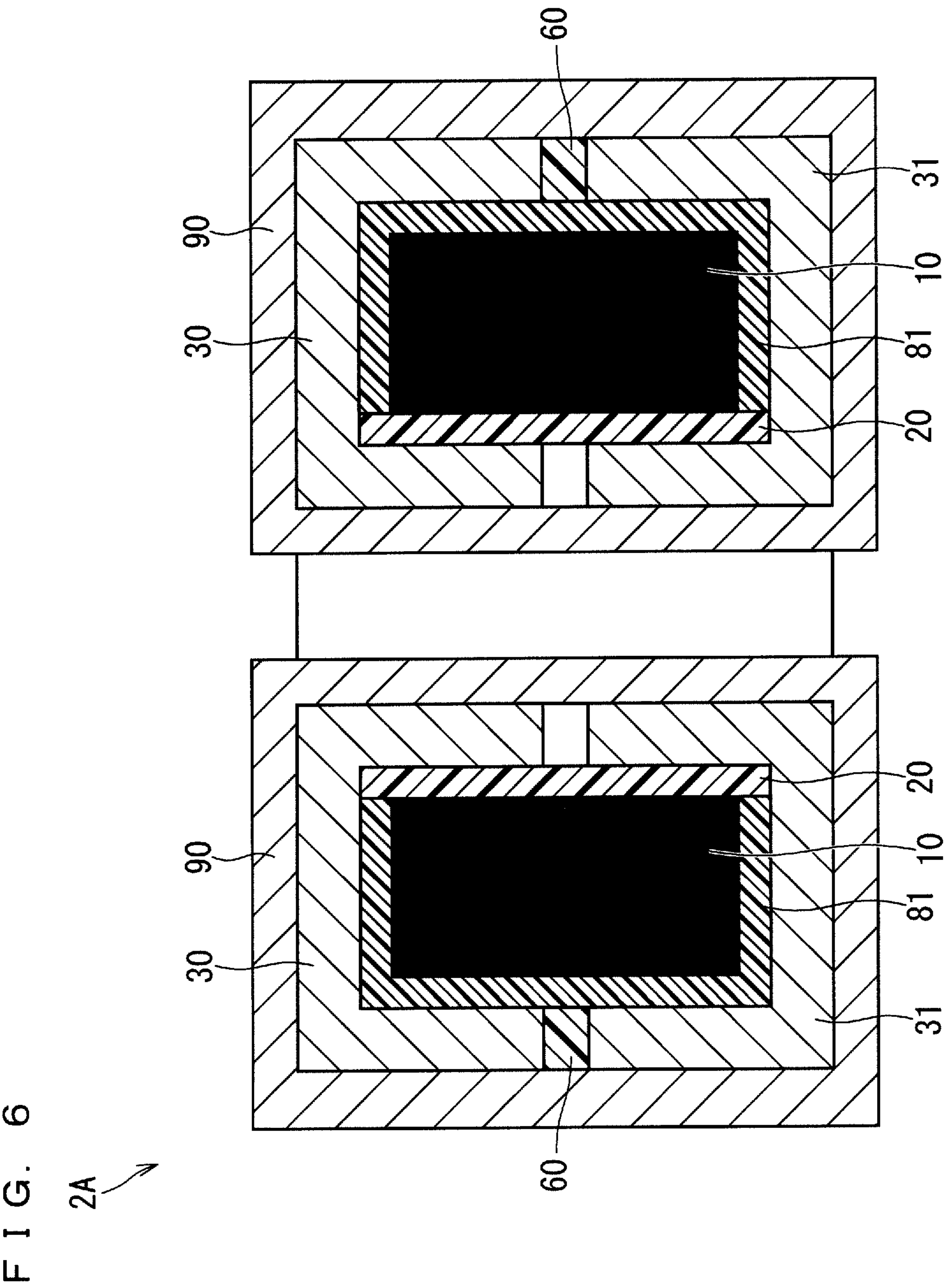
FIG. 6 is a sectional view of a reactor according to Modification 1 of Embodiment 2.

The structure of a reactor 2A according to Modification 1 of Embodiment 2 will be described. FIG. 1 also illustrates the perspective view of the reactor 2A, which is identical to that of the reactor 1 according to Embodiment 1. FIG. 6 is a sectional view of the reactor 2A in the Y-Z plane which extends through the center of the ring of each of the heat-dissipating cases 30 and 31. The reactor 2A includes first heat-dissipating components 81 between the divided cores 10 and the heat-dissipating cases 30 and 31. The first heat-dissipating components 81 are formed between the outer circumferential surface of the divided cores 10 and the heat-dissipating cases 30 and 31, in addition to between the upper surface of the divided cores 10 and the heat-dissipating case 30 and between the lower surface of the divided cores 10 and the heat-dissipating case 31. The first heat-dissipating components 81 may contain a resin material such as epoxy with fluidity, in addition to the aforementioned materials of the first heat-dissipating components 80.

The surface of the divided cores 10 covered by the first heat-dissipating components 81 in the reactor 2A is larger than that of the divided cores 10 covered by the first heat-dissipating components 80 in the reactor 2. Thus, the thermal contact resistance between the divided cores 10 and the heat-dissipating cases 30 and 31 in the reactor 2A is lower than that in the reactor 2.

Since the first heat-dissipating components 81 fix the heat-dissipating cases 30 and 31, the heat-dissipating cases 30 and 31 do not require the fixing holes 70. Since there is no need to form the protrusions 301 and 311 for forming the fixing holes 70 on the outer circumferential surfaces of the heat-dissipating cases 30 and 31, the structures of the heat-dissipating cases 30 and 31 can be simplified. Further, the manufacturing process of fastening the fixing parts 61 to the heat-dissipating cases 30 and 31 can be omitted.

Figure 7:
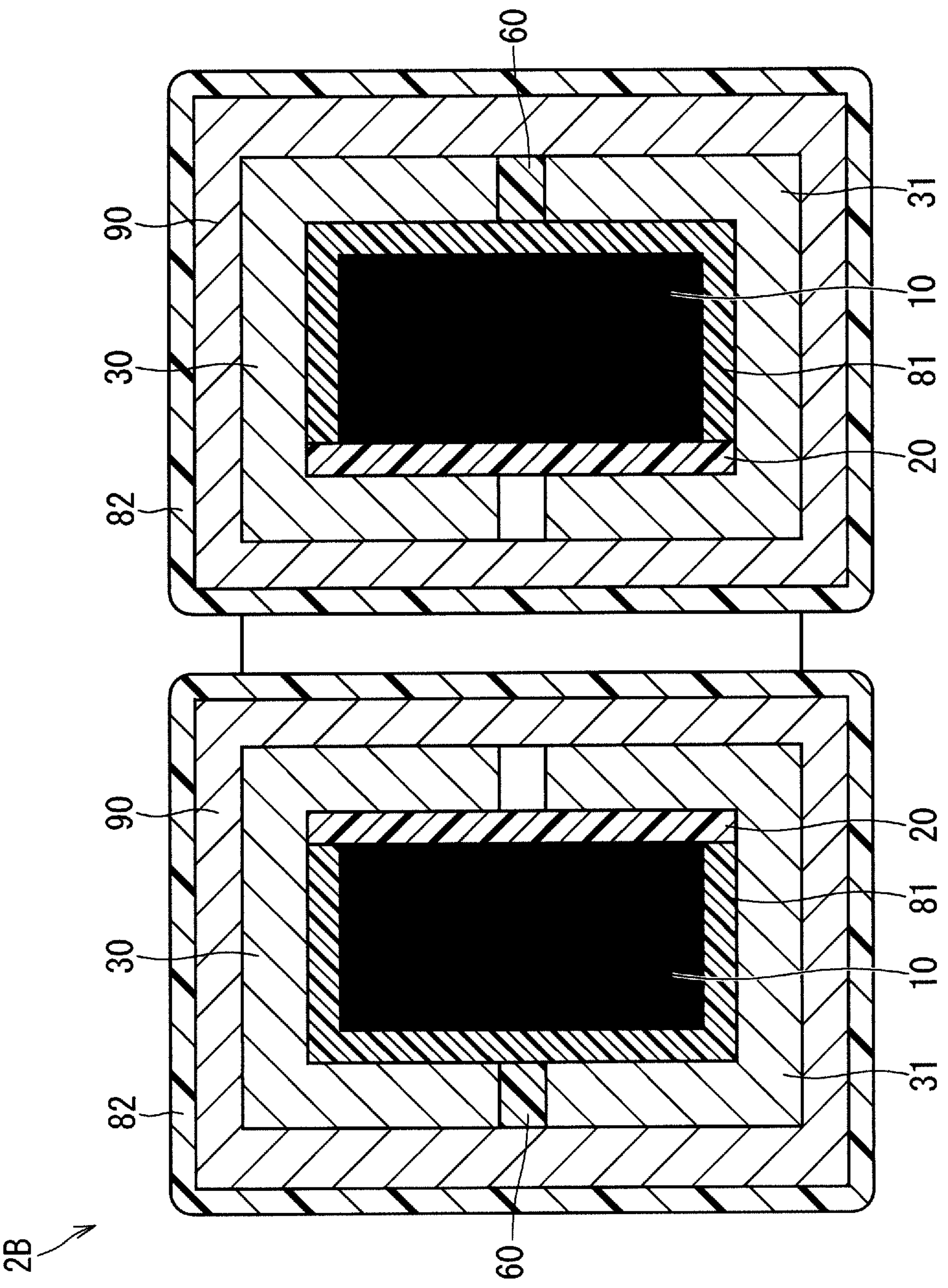
FIG. 7 is a sectional view of a reactor according to Modification 2 of Embodiment 2.

The structure of a reactor 2B according to Modification 2 of Embodiment 2 will be described. FIG. 7 is a sectional view of the reactor 2B in the Y-Z plane which extends through the center of the ring of each of the heat-dissipating cases 30 and 31. The reactor 2B is obtained by forming the reactor 2A and then covering the periphery of the heat-dissipating cases 30 and 31 with a second heat-dissipating component 82. The second heat-dissipating component 82 contains a resin material such as epoxy with fluidity or a rubber material such as silicon or urethane. Consequently, the second heat-dissipating component 82 is filled between the adjacent portions of the coil 90 or between the coil 90 and the heat-dissipating cases 30 and 31. Thus, the heat dissipation from the divided cores 10 in the reactor 2B can be increased more than that in the reactor 2A.

[B-3. Advantages]

The reactor 2 according to Embodiment 2 and the reactor 2A according to Modification 1 of Embodiment 2 include the first heat-dissipating components 80 and the first heat-dissipating components 81, respectively, between the divided cores 10 and the heat-dissipating cases 30 and 31. Thus, the thermal contact resistance between the divided cores 10 and the heat-dissipating cases 30 and 31 is reduced, and the heat dissipation from the divided cores 10 is increased. Further, since the first heat-dissipating components 80 and 81 accommodate variations in dimensions of the divided cores 10 and the heat-dissipating cases 30 and 31, the variations in the contact area between the divided cores 10 and the heat-dissipating cases 30 and 31 through the first heat-dissipating components 80 and 81 are suppressed.

The reactor 2B according to Modification 2 of Embodiment 2 includes the second heat-dissipating component 82 between the adjacent portions of the coil 90 and between the coil 90 and the heat-dissipating cases 30 and 31. Thus, the high heat dissipation is achieved.

C. Embodiment 3

[C-1. Structure]

Figure 8:
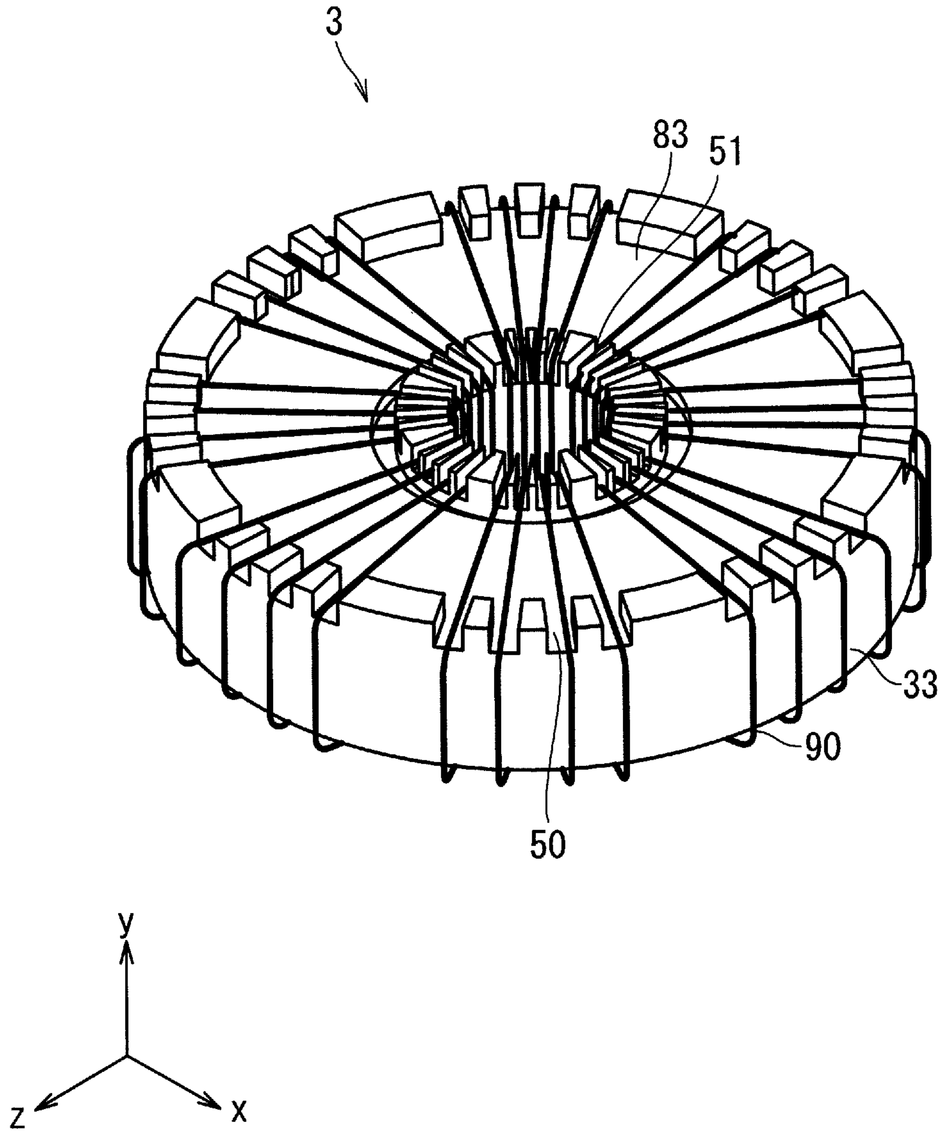
FIG. 8 illustrates a perspective view of a reactor according to Embodiment 3.
Figure 9:
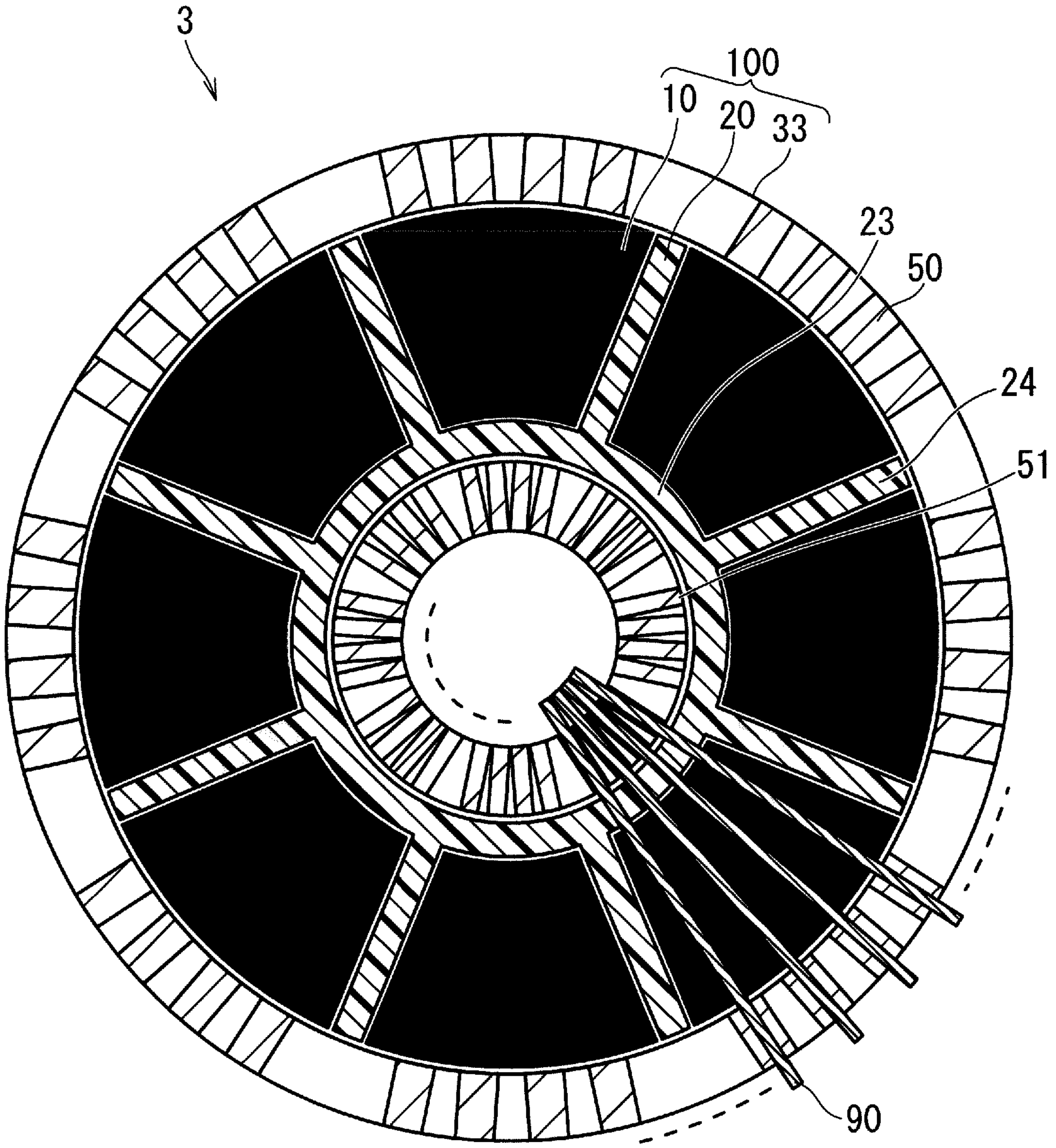
FIG. 9 is a sectional view of the reactor according to Embodiment 3.
Figure 10:
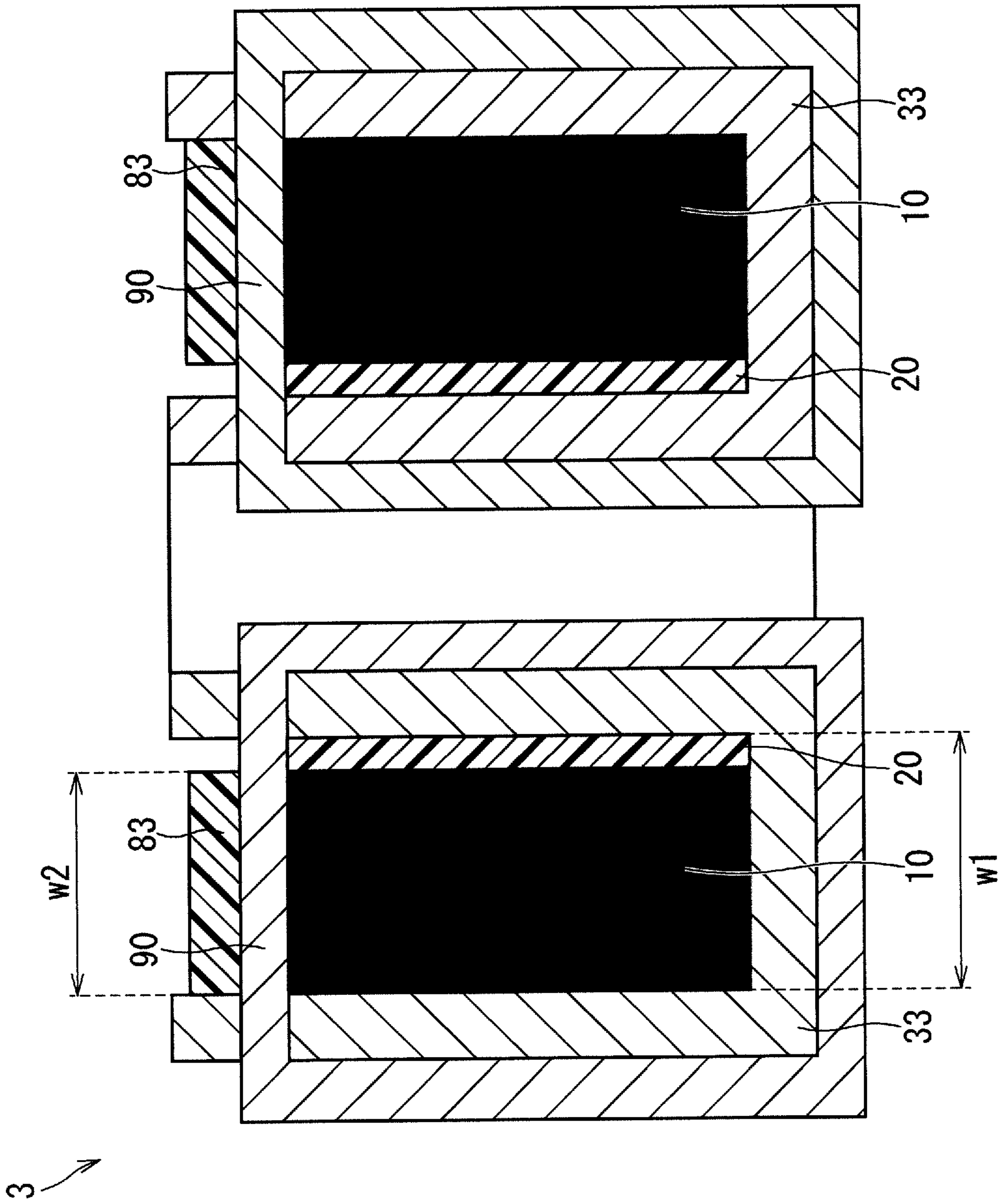
FIG. 10 is a sectional view of the reactor according to Embodiment 3.

A reactor 3 according to Embodiment 3 will be described with reference to FIGS. 8 to 10. FIG. 8 is a perspective view of the reactor 3. In FIG. 8, the horizontal direction is defined as the X-axis, the vertical direction is defined as the Y-axis, and the depth direction is defined as the Z-axis. FIG. 9 is a sectional view of the reactor 3 in the X-Z plane. FIG. 10 is a sectional view of the reactor 3 in the Y-Z plane which extends through the center of the ring of an annular heat-dissipating case 33.

The reactor 3 includes the heat-dissipating case 33 instead of the heat-dissipating cases 30 and 31, and a third heat-dissipating component 83 on the upper surface of the divided cores 10. The structure of the reactor 3 other than the heat-dissipating case 33 and the third heat-dissipating component 83 is identical to that of the reactor 1 according to Embodiment 1.

The heat-dissipating case 33 is annular with one end surface opened, and houses the divided cores 10 and the core gap part 20. The heat-dissipating case 33 includes cutout portions 50 on the edge of the outer circumferential surface that is in contact with the open end surface. The heat-dissipating case 33 includes cutout portions 51 on the edge of the inner circumferential surface that is in contact with the open end surface. The coil 90 is wound around the heat-dissipating case 33 along the cutout portions 50 and 51. Since the cutout portions 50 and 51 guide the coil 90, not only manual winding of the coil 90 is facilitated but also a mistake in the number of windings is prevented. Thus, the manufacturing cost of the reactor 3 is reduced.

As illustrated in FIG. 9, the cutout portions 50 on the outer circumferential surface of the heat-dissipating case 33 are disposed distant from the thin plate parts 24 of the core gap part 20 so that the coil 90 wound along the cutout portions 50 does not overlap the coil gaps. This reduces the eddy-current loss caused by the linkage of the magnetic flux leaked from the core gaps with the coil 90.

The heat-dissipating case 33 is made of a material whose thermal conductivity is as high as 100 W/(m·K) or more, for example, copper, aluminum, gold, silver, or silicon.

The thicker the heat-dissipating case 33 is, the greater thermal diffusivity it has. Preferably, the heat-dissipating case 33 is approximately 1 to 5 mm thick in consideration of the facilitation of the manufacture.

The third heat-dissipating component 83 is an annular plate or block. The third heat-dissipating component 83 is made of a material whose thermal conductivity is as high as 100 W/(m·K) or more, for example, copper, aluminum, gold, silver, silicon, or nickel. The thicker the third heat-dissipating component 83 is, the greater thermal diffusivity it has. Preferably, the third heat-dissipating component 83 is approximately 1 to 5 mm thick in consideration of the facilitation of the manufacture. The third heat-dissipating component 83 may be in contact with the heat-dissipating case 33. The third heat-dissipating component 83 is structured so that the third heat-dissipating component 83 avoids contact with both of the cutout portions 50 on the outer circumferential surface of the heat-dissipating case 33 and the cutout portions 51 on the inner circumferential surface thereof by reducing a width w2 of the third heat-dissipating component 83 more than a width w1 of the heat-dissipating case 33. This prevents the heat-dissipating case 33 and the third heat-dissipating component 83 from functioning as a one-turn coil relative to the cross-section of the divided cores 10.

[C-2. Advantages]

In the reactor 3 according to Embodiment 3, one end surface of the heat-dissipating case 33 is an opened end surface. The heat-dissipating case 33 includes the cutout portions 50 and the cutout portions 51 on the edges of the outer circumferential surface and the inner circumferential surface, respectively, which are in contact with the opened end surface. The coil 90 is wound along the cutout portions 50 and 51. Thus, using the cutout portions 50 and 51 as guides, manual winding of the coil 90 can be facilitated. Further, a mistake in the number of windings is prevented. Thus, the manufacturing cost of the reactor 3 is reduced.

D. Embodiment 4

[D-1. Structure]

Figure 11:
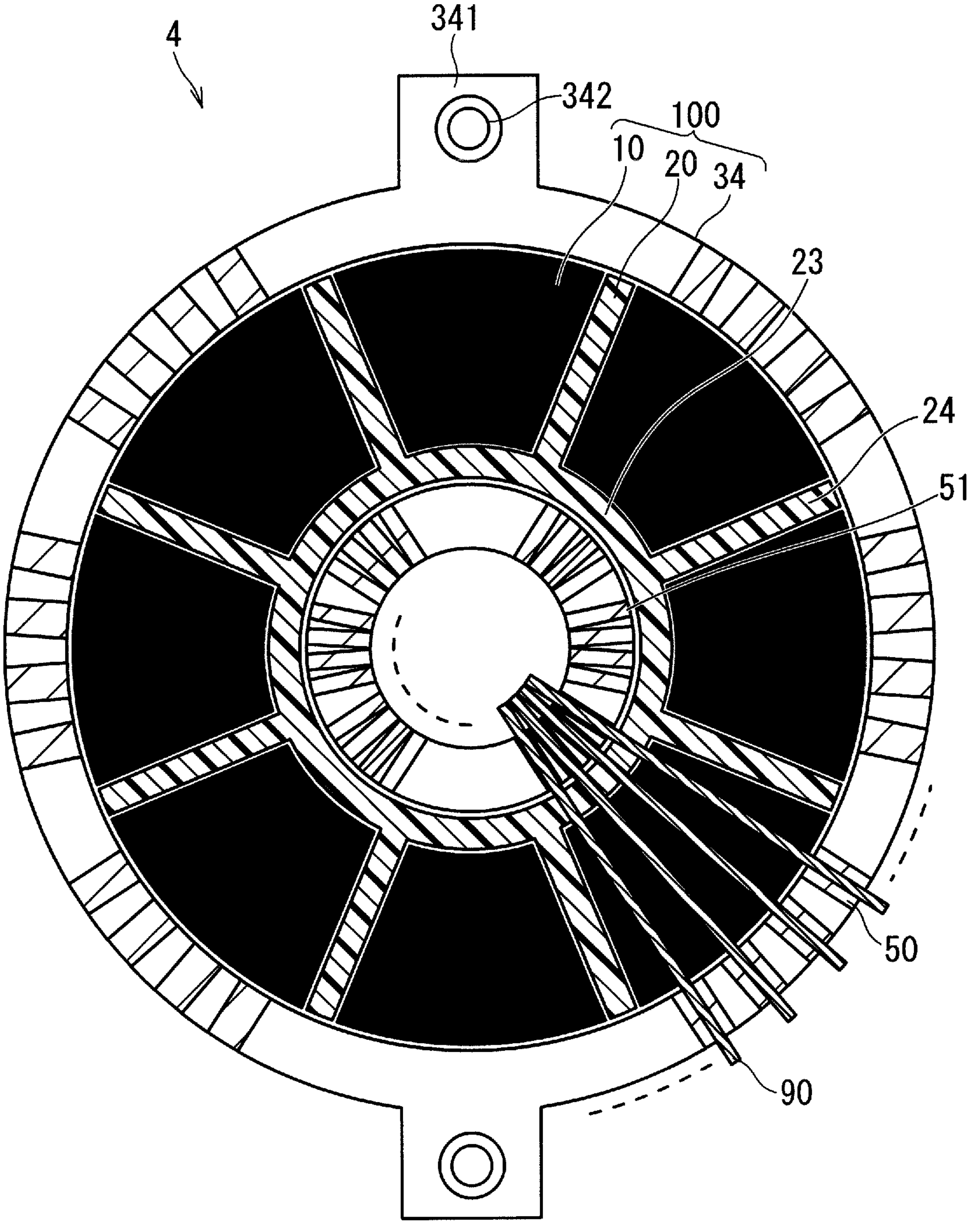
FIG. 11 is a sectional view of a reactor according to Embodiment 4.
Figure 12:
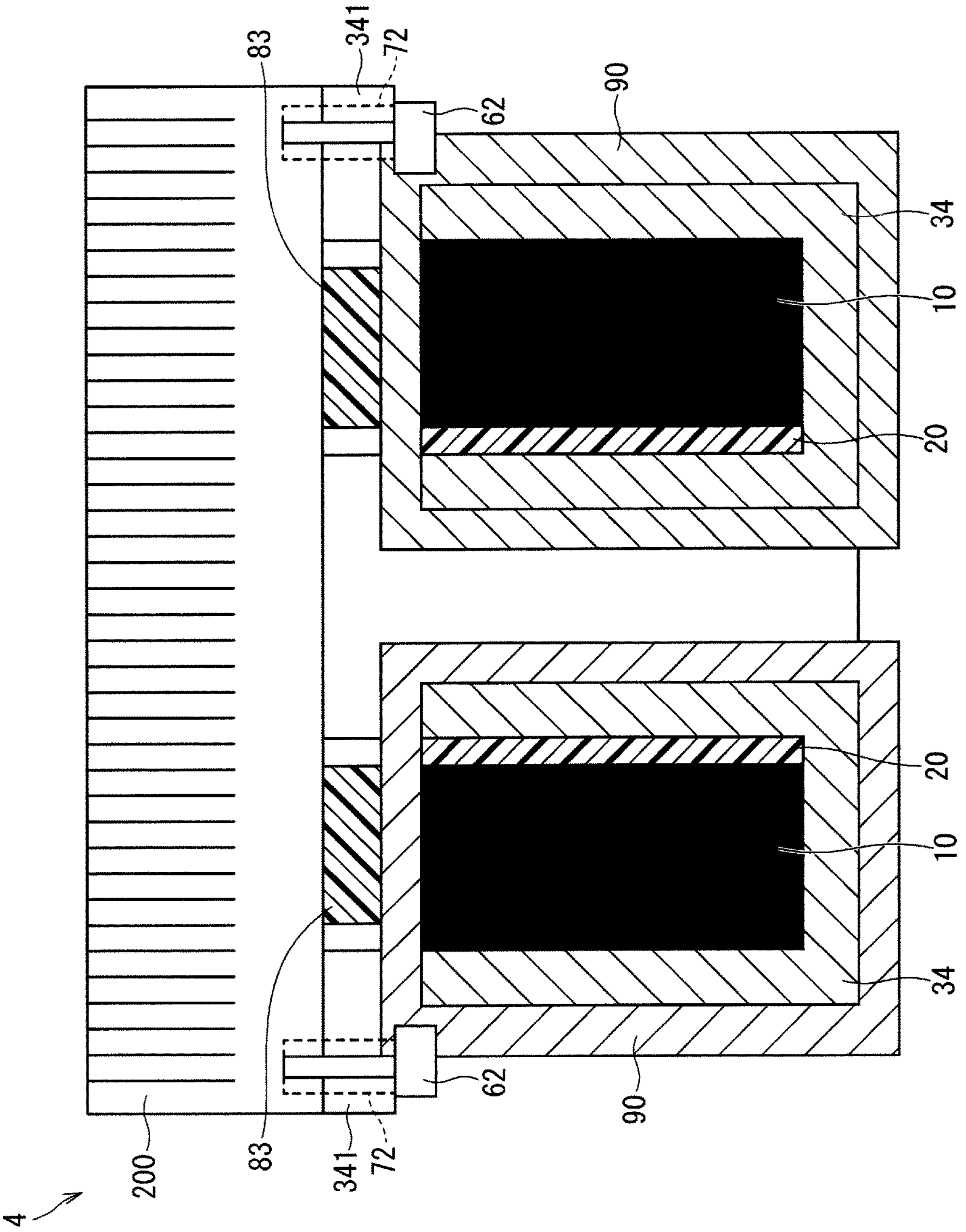
FIG. 12 is a sectional view of the reactor according to Embodiment 4.

A reactor 4 according to Embodiment 4 will be described with reference to FIGS. 11 to 12. FIG. 11 is a sectional view of the reactor 4 in the X-Z plane. FIG. 12 is a sectional view of the reactor 4 in the Y-Z plane which extends through the center of the ring of an annular heat-dissipating case 34.

The reactor 4 includes the heat-dissipating case 34 instead of the heat-dissipating case 33 of the reactor 3. The structure of the reactor 4 other than the heat-dissipating case 34 is identical to that of the reactor 3 according to Embodiment 3.

One end surface of the heat-dissipating case 34 is an opened end surface. The edge of the outer circumferential surface of the heat-dissipating case 34 that is in contact with the open end surface has protrusions 341 protruding outside the heat-dissipating case 34 from the edge. Each of the protrusions 341 is formed by, for example, bending, into an L-shape, a portion sandwiched by two of the cutout portions 50 on the outer circumferential surface of the heat-dissipating case 33 according to Embodiment 3. The structure of the heat-dissipating case 34 other than the protrusions 341 is identical to that of the heat-dissipating case 33 according to Embodiment 3. The protrusions 341 include fixing holes 72. The heat-dissipating case 34 is fixed to a cooler 200 using fixing parts 62 inserted into the fixing holes 72.

The cooler 200 is fixed to the heat-dissipating case 34 while covering the open end surface of the heat-dissipating case 34. Thus, the heat generated in the divided cores 10 is dissipated to the cooler 200 through the heat-dissipating case 34. Further, the heat generated in the coil 90 is dissipated to the cooler 200 through the third heat-dissipating component 83. Since the thermal resistance from the cooler 200 to the atmosphere is very low, increasing the surface area of the cooler 200 more than the surface area of the heat-dissipating case 34 increases the heat dissipation from the divided cores 10 and the coil 90.

The cooler 200 is made of a material whose thermal conductivity is as high as 100 W/(m·K) or more, for example, copper, aluminum, gold, silver, silicon, or nickel.

The cooling system of the cooler 200 may be any systems including natural air cooling, forced-air cooling, and liquid cooling.

The breakdown voltage is required between the divided cores 10 or the coil 90 and the cooler 200. When the insulation coating of the divided cores 10 or the coil 90 cannot maintain a sufficient breakdown voltage, a resin or an insulating paper may be formed between the divided cores 10 or the coil 90 and the cooler 200 as an insulating material. Here, examples of the resin include polypropylene (PP), ABS, polyethylene terephthalate (PET), polycarbonate (PC), fluorine, phenol, melamine, polyurethane, epoxy, silicon, and polybutylene terephthalate (PBT), polyphenylene sulfide (PPS), and polyether ether ketone (PEEK) which contain thermally conductive fillers. Further, examples of the available insulating paper include kraft pulp, aramid, and a fiber.

When the insulating material is formed, the thermal resistance between the divided cores 10 and the cooler 200 increases. However, since the thermal resistance between the cooler 200 and the atmosphere is low, there is no problem in the heat dissipation from the divided cores 10 and the coil 90. Moreover, the sufficient breakdown voltage can be maintained between the divided cores 10 or the coil 90 and the cooler 200.

[D-2. Advantages]

In the reactor 4 according to Embodiment 4, one end surface of the heat-dissipating case 34 is an opened end surface, the heat-dissipating case 34 includes the protrusions 341 protruding from the edge of the outer circumferential surface that is in contact with the open end surface, and the protrusions 341 are fixed to the cooler 200 disposed on the open end surface of the heat-dissipating case 34. This can dissipate the heat generated in the divided cores 10 or the coil 90 to the cooler 200, which improves the heat dissipation from the divided cores 10 and the coil 90.

E. Embodiment 5

Embodiments 1 to 4 describe the core gap part 20 as a unitary component consisting of the cylindrical part 23 and the plurality of thin plate parts 24. In contrast in Embodiment 5, the core gap part 20 consists of a combination of a plurality of components each separately formed. Hereinafter, a reactor 5 according to Embodiment 5 will be described as an example structure in which the core gap part 20 according to Embodiment 1 consists of the combination of the plurality of components each separately formed. Embodiment 5 is also applicable to Embodiments 2 to 4.

[E-1. Structure]

Figure 13:
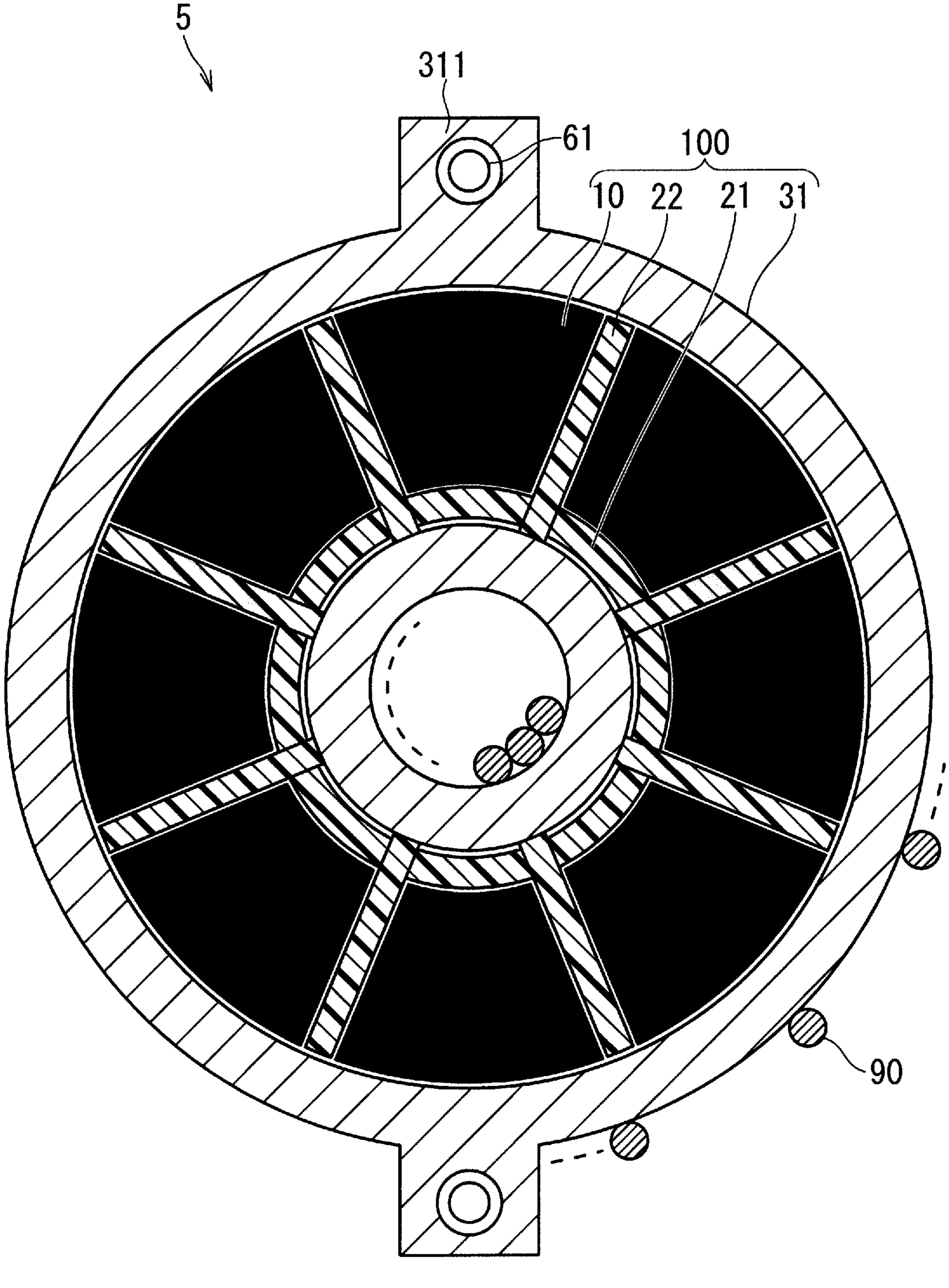
FIG. 13 is a sectional view of a reactor according to Embodiment 5.
Figure 14:
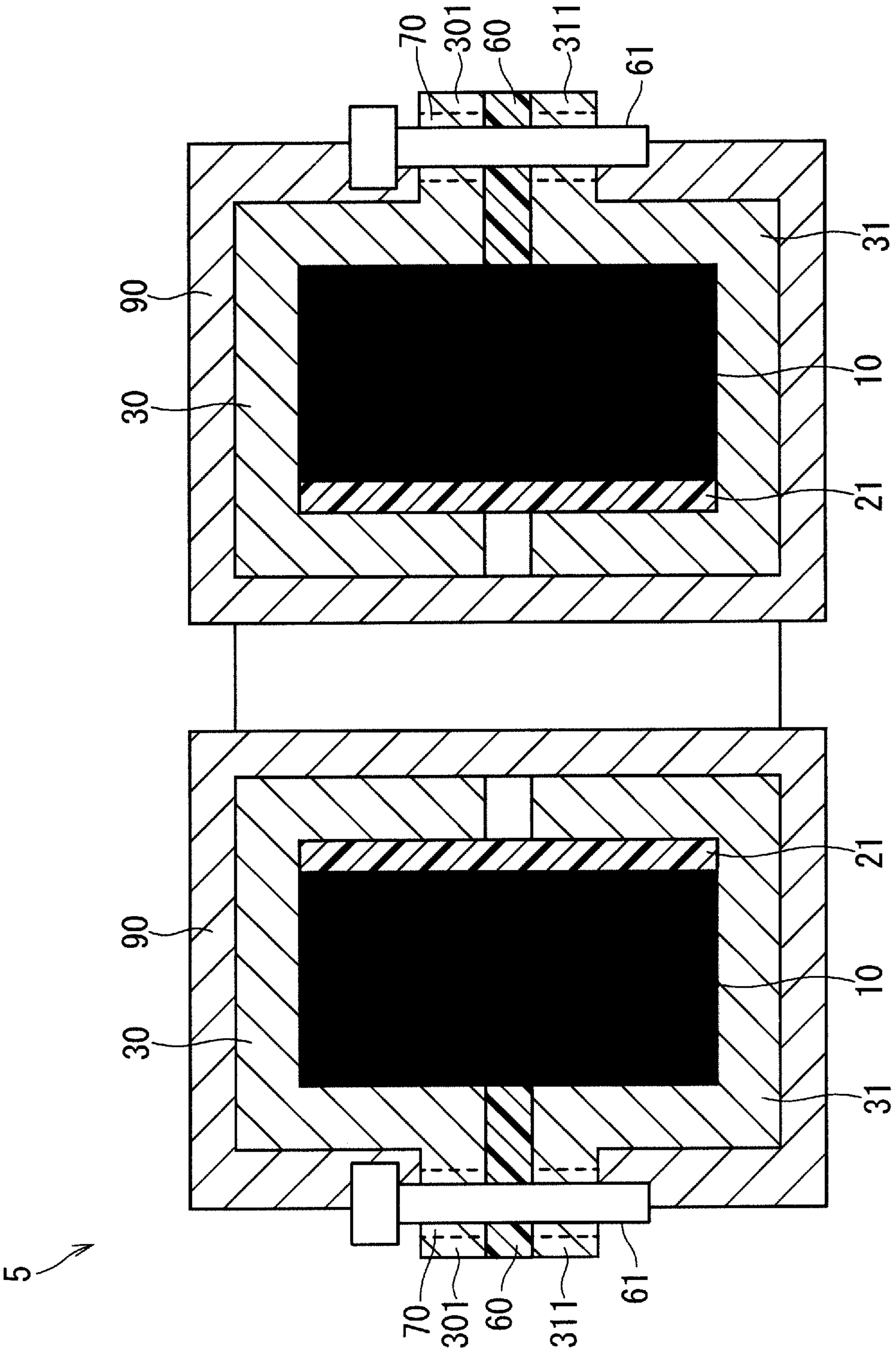
FIG. 14 is a sectional view of the reactor according to Embodiment 5.
Figure 15:
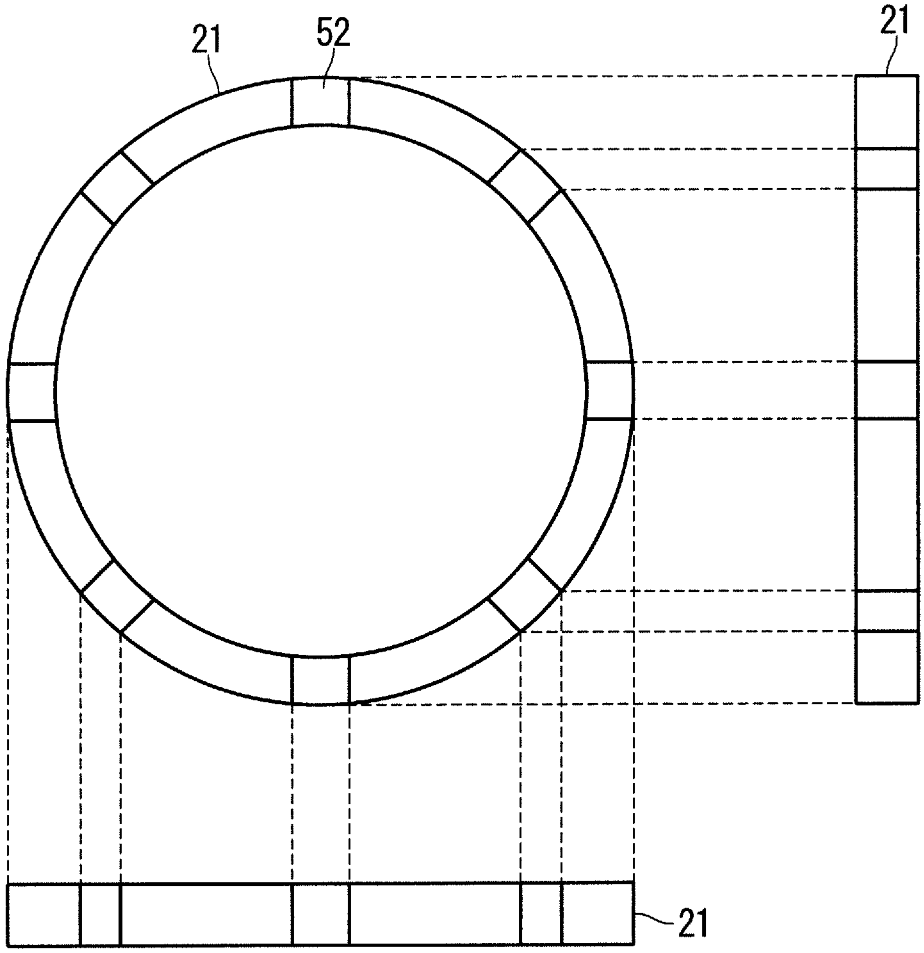
FIG. 15 is an orthographic view of a first core gap part.
Figure 16:
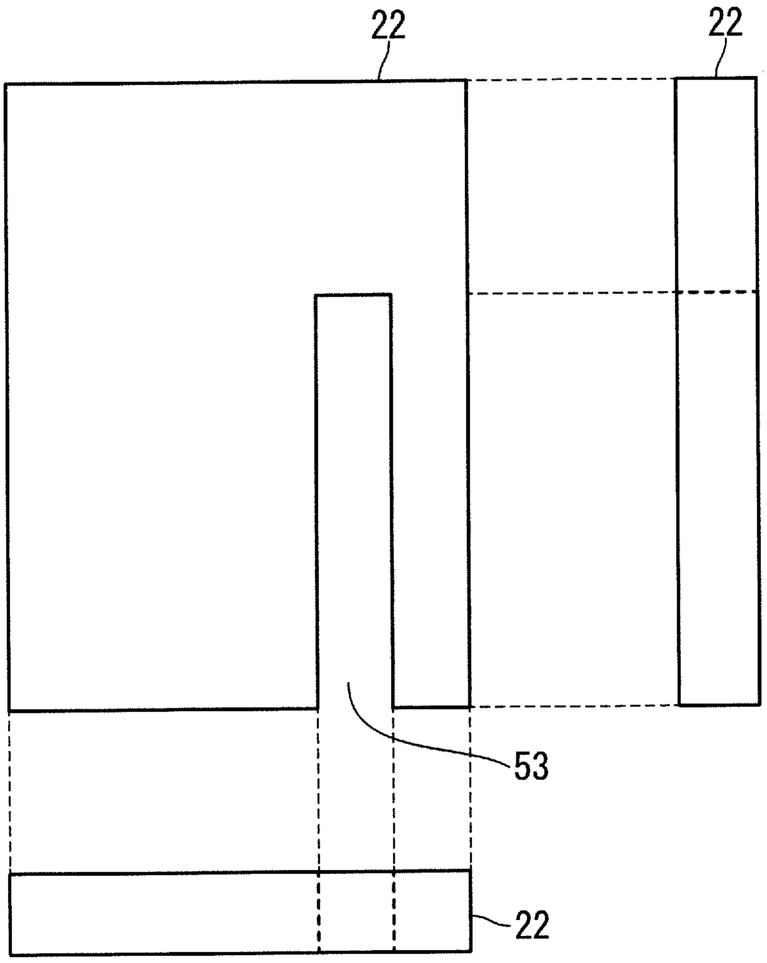
FIG. 16 is an orthographic view of a second core gap part.

The reactor 5 according to Embodiment 5 will be described with reference to FIGS. 13 to 16. FIG. 1 also illustrates the perspective view of the reactor 5, which is identical to that of the reactor 1 according to Embodiment 1. FIG. 13 is a sectional view of the reactor 5 in the X-Z plane. FIG. 14 is a sectional view of the reactor 5 in the Y-Z plane which extends through the center of the ring of the annular heat-dissipating case 31. FIG. 15 is an orthographic view of a first core gap part 21, and FIG. 16 is an orthographic view of second core gap parts 22.

The core gap part 20 of the reactor 5 consists of a combination of the cylindrical first core gap part 21 and the laminar second core gap parts 22. The structure of the reactor 5 other than the core gap part 20 is identical to that of the reactor 1 according to Embodiment 1.

As illustrated in FIG. 15, the cylindrical first core gap part 21 includes eight cutout portions 52 corresponding to the number of the second core gap parts 22. As illustrated in FIG. 16, the laminar second core gap parts 22 include cutout portions 53 corresponding to the cutout portions 52 of the first core gap part 21. The core gap part 20 is formed with a combination of the first core gap part 21 and the second core gap parts 22 by inserting the second core gap parts 22 into the cutout portions 52 of the first core gap part 21 so that the cutout portions 53 of the second core gap parts 22 fit the cutout portions 52 of the first core gap part 21.

The first core gap part 21 and the second core gap parts 22 are made of a non-magnetic material such as a resin or an insulating paper. Examples of the resin contained in the first core gap part 21 and the second core gap parts 22 include polypropylene (PP), ABS, polyethylene terephthalate (PET), polycarbonate (PC), fluorine, phenol, melamine, polyurethane, epoxy, and silicon. Examples of the insulating paper contained in the first core gap part 21 and the second core gap parts 22 include kraft pulp, aramid, and a fiber.

FIG. 15 illustrates the eight cutout portions 52 the number of which corresponds to the number of the second core gap parts 22. When the number of the second core gap parts 22 is changed, the number of the cutout portions 52 is accordingly changed. Further, the first core gap part 21 is cylindrical, and the second core gap parts 22 are laminar according to Embodiment 5. Since the shapes of the first core gap part 21 and the second core gap parts 22 are simple in this example, the manufacturing cost can be reduced. However, the shapes of the first core gap part 21 and the second core gap parts 22 are not limited to these.

[E-2. Advantages]In the reactor according to Embodiment 5, the core gap part 20 includes: the first core gap part 21 including the plurality of cutout portions 52; and a plurality of the second core gap parts 22 to be inserted into the plurality of cutout portions 52 of the first core gap part 21. As such, forming the core gap part 20 with a combination of the plurality of components can facilitate the manufacturing of the core gap part 20.

F. Embodiment 6

Embodiment 5 describes that the core gap part 20 consists of a combination of the cylindrical first core gap part 21 and the laminar second core gap parts 22. Embodiment 6 will describe various modifications of the first core gap part 21. Embodiment 6 is also applicable to Embodiments 2 to 4.

[F-1. Structure]

Figure 17:
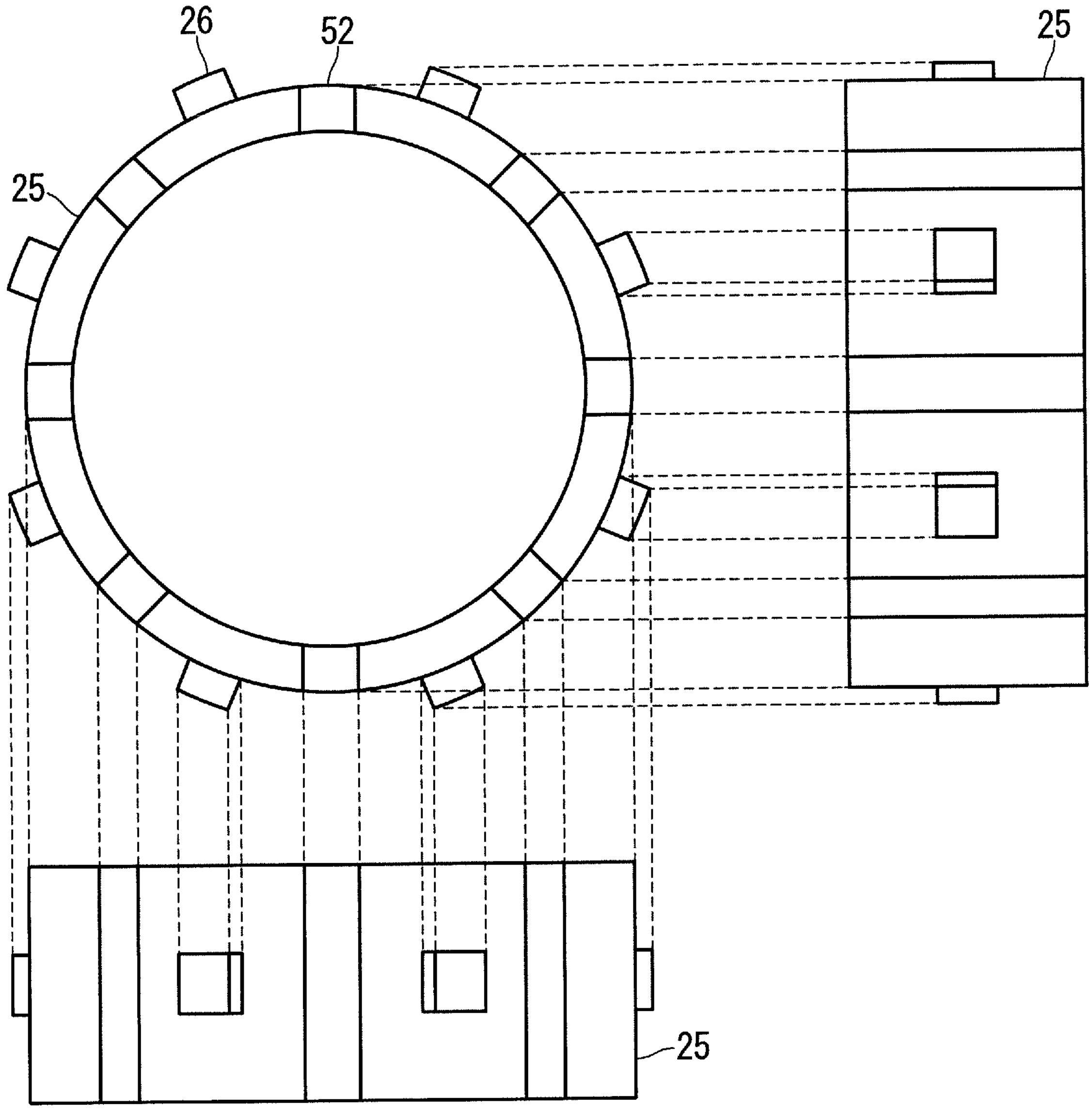
FIG. 17 is an orthographic view of the first core gap part.

FIG. 17 is an orthographic view of a first core gap part 25. The first core gap part 25 is identical to the first core gap part 21 except for having bumps 26 on the outer circumferential surface of the cylindrical part.

The advantages of the first core gap part 25 are as follows. In processes of manufacturing a reactor, the first core gap part 25 and then the divided cores 10 are inserted into the heat-dissipating case 31. Here, the divided cores 10 abut the bumps 26 of the first core gap part 25, and are pressed toward the outer circumference of the heat-dissipating case 31. Thus, the divided cores 10 are reliably in contact with the outer circumferential surface of the heat-dissipating case 31, which significantly increases the heat dissipation from the divided cores 10 as described in Embodiment 1.

Figure 18:
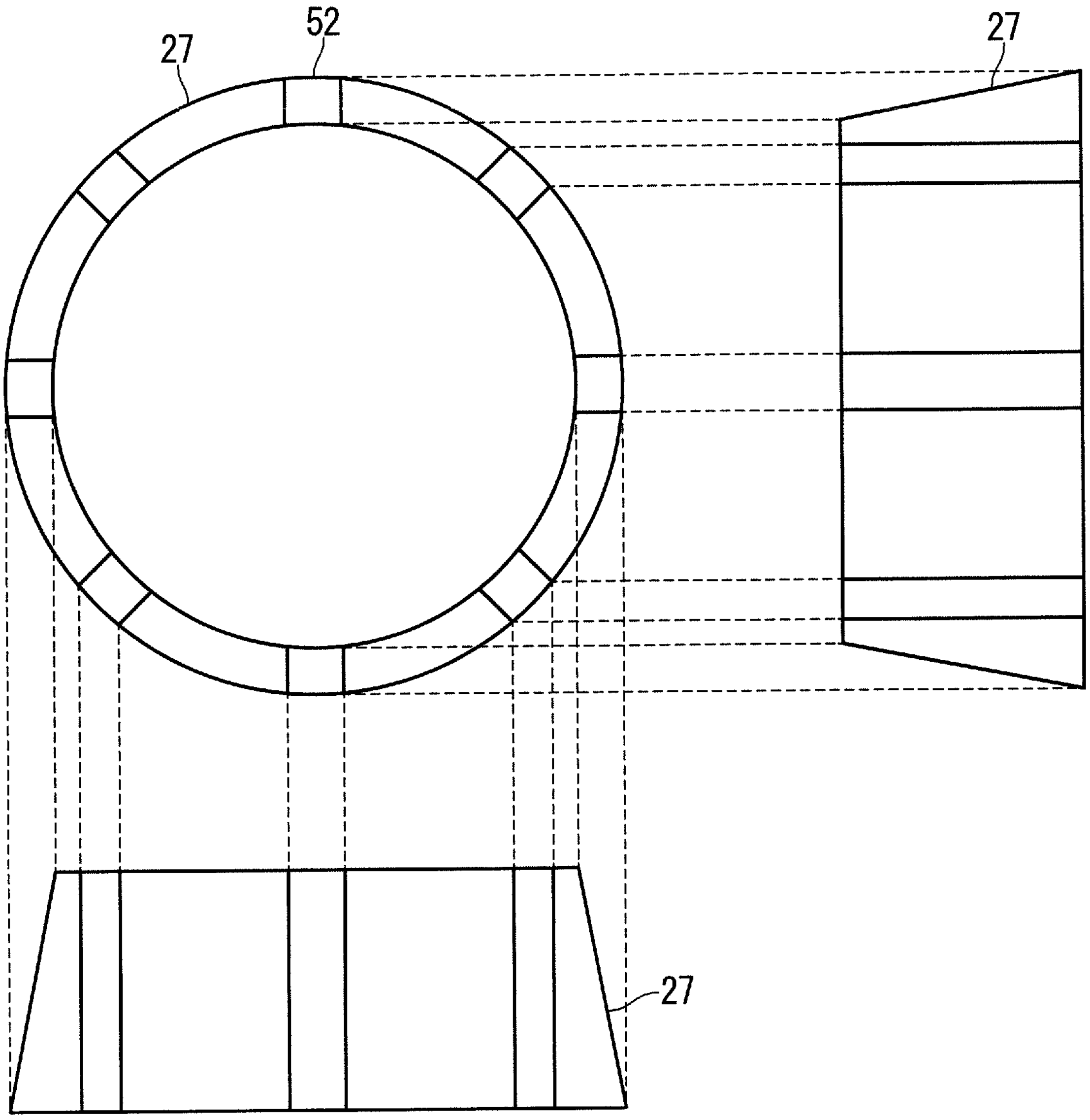
FIG. 18 is an orthographic view of the first core gap part.

FIG. 18 is an orthographic view of a first core gap part 27. The first core gap part 27 is identical to the first core gap part 21 except for being tapered toward the direction of the cylindrical axis.

The advantages of the first core gap part 27 are as follows. In processes of manufacturing a reactor, the first core gap part 27 and then the divided cores 10 are inserted into the heat-dissipating case 31. Here, the divided cores 10 abut the first core gap part 27. Since the first core gap part 27 is tapered toward the direction of the cylindrical axis, the divided cores 10 are pressed toward the outer circumference of the heat-dissipating case 31, and are reliably in contact with the outer circumferential surface of the heat-dissipating case 31. Thus, the heat dissipation from the divided cores 10 is significantly increased as described in Embodiment 1.

Figure 19:
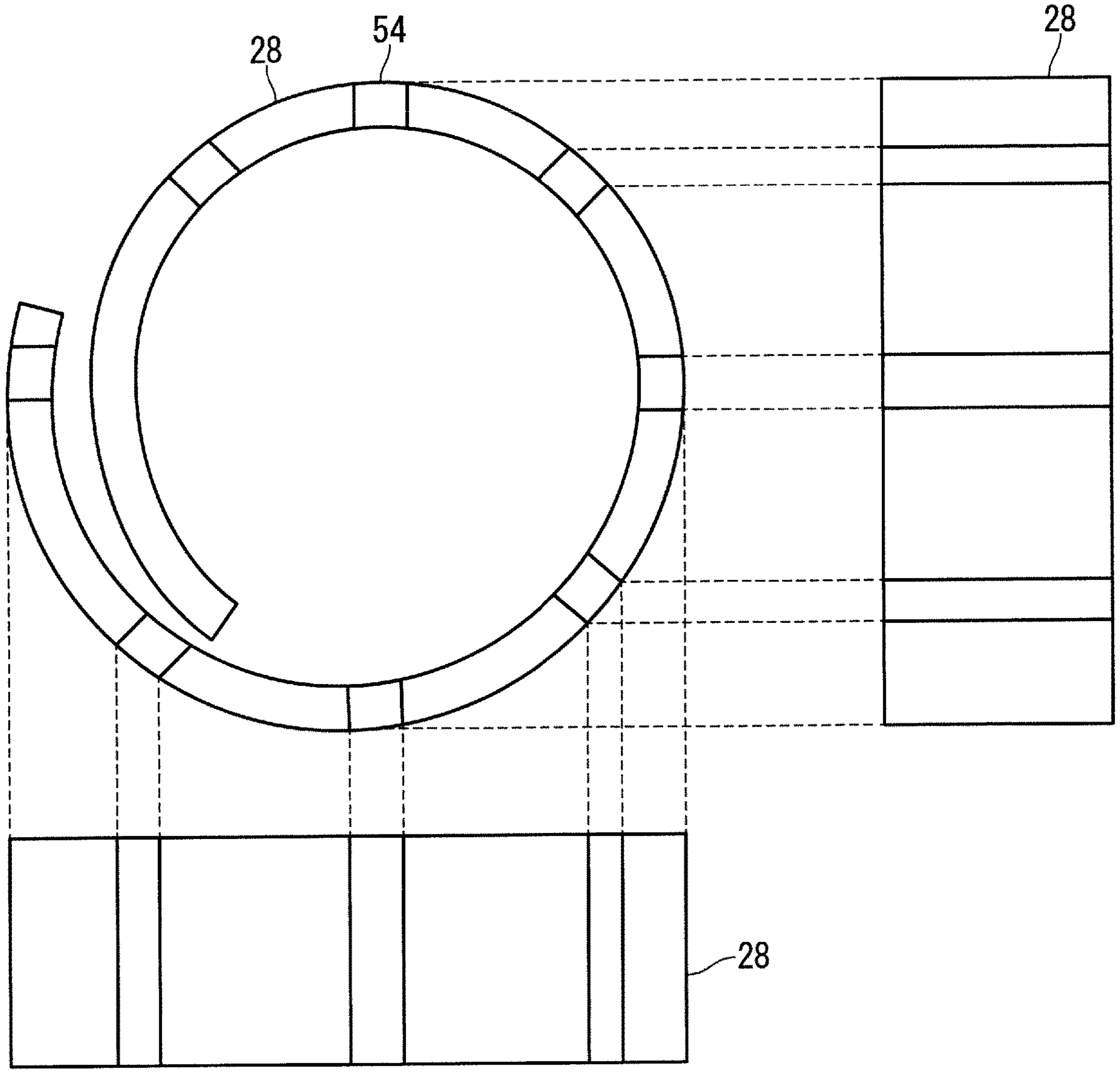
FIG. 19 is an orthographic view of the first core gap part.

FIG. 19 is an orthographic view of a first core gap part 28. The first core gap part 28 is a cylindrically wound thin plate, and includes eight cutout portions 54 corresponding to the number of the second core gap parts 22 in the thickness direction. The second core gap parts 22 are inserted into the cutout portions 54 which have functions similar to those of the cutout portions 52 in the first core gap part 21.

The advantages of the first core gap part 28 are as follows. In processes of manufacturing a reactor, the first core gap part 28 is cylindrically wound, and inserted into the heat-dissipating case 31. Then, the divided cores 10 are inserted into the heat-dissipating case 31. Here, the first core gap part 28 spreads toward the outer circumference of the heat-dissipating case 31 with the stress of restoring the first core gap part 28 to its laminar shape. This stress presses the divided cores 10 toward the outer circumference of the heat-dissipating case 31. Thereby, the divided cores 10 are reliably in contact with the outer circumferential surface of the heat-dissipating case 31. Thus, the heat dissipation from the divided cores 10 is significantly increased as described in Embodiment 1.

[F-2. Advantages]

The first core gap part 25 is cylindrical, and includes bumps 26 on the outer circumferential surface. When the first core gap part 25 is used in a reactor, the divided cores 10 inserted into the heat-dissipating case 31 abut the bumps 26 of the first core gap part 25, and are pressed toward the outer circumference of the heat-dissipating case 31. Thus, the divided cores 10 are reliably in contact with the outer circumferential surface of the heat-dissipating case 31, which increases the heat dissipation.

The first core gap part 27 is cylindrical, and the outer circumferential surface of the first core gap part 27 is tapered toward the direction of the cylindrical axis. When the first core gap part 27 is used in a reactor, the divided cores 10 inserted into the heat-dissipating case 31 are pressed toward the outer circumference of the heat-dissipating case 31 along the outer circumferential surface of the first core gap part 27, and are reliably in contact with the outer circumferential surface of the heat-dissipating case 31. This increases the heat dissipation from the divided cores 10.

The first core gap part 28 is a cylindrically wound thin plate. When the first core gap part 28 is used in a reactor, it is cylindrically wound, and inserted into the heat-dissipating case 31. Thus, the divided cores 10 inserted into the heat-dissipating case 31 are pressed toward the outer circumference of the heat-dissipating case 31 with the stress of restoring the first core gap part 28 to its laminar shape, and are reliably in contact with the outer circumferential surface of the heat-dissipating case 31. This increases the heat dissipation from the divided cores 10.

Embodiments can be freely combined, and appropriately modified or omitted within the scope of the present invention. Although this invention has been described in detail, the description is in all aspects illustrative and does not restrict the invention. It is therefore understood that numerous modifications and variations that have yet been exemplified can be devised without departing from the scope of the invention.

EXPLANATION OF REFERENCE SIGNS

1, 2, 2A, 2B, 3, 4, 5 reactor, 10 divided core, 20 core gap part, 21, 25, 27, 28 first core gap part, 22 second core gap part, 23 cylindrical part, 24 thin plate part, 26 bump, 30, 31, 33, 34 heat-dissipating case, 50, 51, 52, 53, 54 cutout portion, 60, 61, 62 fixing part, 70, 72, 603 fixing hole, 80, 81 first heat-dissipating component, 82 second heat-dissipating component, 83 third heat-dissipating component, 90 coil, 100 magnetic part, 200 cooler, 301, 311, 341, 602 protrusion, 601 annulus.

The invention claimed is:

1. A reactor, comprising:

a plurality of divided cores having a shape obtained by dividing an annular core in a circumferential direction, the divided cores being made of a soft magnetic material;

a core gap part disposed between the divided cores in the annular core formed by combining the plurality of divided cores, the core gap part being made of a non-magnetic material;

an annular heat-dissipating case that houses the divided cores and the core gap part; and a coil wound around the heat-dissipating case, wherein, one end surface of the heat-dissipating case is an open end surface, the heat-dissipating case includes cutout portions on edges of an outer circumferential surface and an inner circumferential surface that are in contact with the open end surface, the coil is wound along the cutout portions, and the cutout portions in the heat-dissipating case are disposed distant from the core gap part so that the coil wound along the cutout portions is disposed only in a region overlapping the divided cores.

2. The reactor according to claim 1, wherein the heat-dissipating case includes protrusions protruding from an edge of an outer circumferential surface that is in contact with the open end surface, and the protrusions are fixed to a cooler disposed on the open end surface of the heat-dissipating case.

* * * * *